United States Patent
Singh et al.

(10) Patent No.: US 11,481,683 B1
(45) Date of Patent: Oct. 25, 2022

(54) MACHINE LEARNING MODELS FOR DIRECT HOMOGRAPHY REGRESSION FOR IMAGE RECTIFICATION

(71) Applicant: Amazon Technologies, Inc., Seattle, WA (US)

(72) Inventors: Kunwar Yashraj Singh, Redmond, WA (US); Joaquin Zepeda Salvatierra, Mercer Island, WA (US); Erhan Bas, Sammamish, WA (US); Vijay Mahadevan, Los Angeles, CA (US); Jonathan Wu, Seattle, WA (US); Rahul Bhotika, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 16/888,589

(22) Filed: May 29, 2020

(51) Int. Cl.
| | |
|---|---|
| *G06F 15/18* | (2006.01) |
| *G06N 20/00* | (2019.01) |
| *G06T 3/00* | (2006.01) |
| *G06N 5/04* | (2006.01) |
| *G06F 17/16* | (2006.01) |

(52) U.S. Cl.
CPC .............. *G06N 20/00* (2019.01); *G06F 17/16* (2013.01); *G06N 5/04* (2013.01); *G06T 3/0006* (2013.01)

(58) Field of Classification Search
CPC .............. G06T 7/80; G06T 2207/10016; G06T 3/4038; G06T 2207/30244; G06T 5/50; G06T 2207/20221; G06T 7/246; G06T 5/006; G06T 2207/20084; G06T 7/11; G06T 2207/20081; G06T 3/0068; G06T 2207/30208; G06V 10/757; G06V 20/20; G06V 10/82; G06V 10/443; G06V 10/10; G06V 10/751
See application file for complete search history.

(56) References Cited

FOREIGN PATENT DOCUMENTS

| CN | 107566688 A | * | 1/2018 | |
|---|---|---|---|---|
| CN | 107689035 A | * | 2/2018 | .......... G06N 3/0454 |
| CN | 112785622 A | * | 5/2021 | |

OTHER PUBLICATIONS

Abbas et al., "Recovering Homography from Camera Captured Documents using Convolutional Neural Networks", Computer Vision and Pattern Recognition, Sep. 2017, 10 pages.
Barron, Jonathan T., "A General and Adaptive Robust Loss Function", Conference: 2019 IEEE/CVF Conference on Computer Vision and Pattern Recognition (CVPR), Apr. 2019, 19 pages.

(Continued)

*Primary Examiner* — Khalid W Shaheed
(74) *Attorney, Agent, or Firm* — Nicholson De Vos Webster & Elliott LLP

(57) ABSTRACT

Techniques for creating machine learning models for direct homography regression for image rectification are described. In certain embodiments, a training service trains an algorithm on a source view of a training image and a homography matrix of the training image into a machine learning model that generates a normalized homography matrix for an input of the source view. The normalized homography matrix may then be utilized to generate a target view of an image input into the machine learning model. The target view of the image may be used in a document processing pipeline for document images captured using cameras.

20 Claims, 11 Drawing Sheets

(56) References Cited

OTHER PUBLICATIONS

Bukhari et al., "Dewarping of Document Images using Coupled-Snakes", In: Proceedings of Third International Workshop on Camera-Based Document Analysis and Recognition, Jan. 2009, 8 pages.
Burden et al., "Rectification of Camera-Captured Document Images with Mixed Contents and Varied Layouts", 2019 16th Conference on Computerand Robot Vision (CRV), IEEE, 2019, pp. 33-40.
Chollet, Francois, "Xception: Deep Learning with Depthwise Separable Convolutions", 2017 IEEE Conference on Computer Vision and Pattern Recognition (CVPR), Apr. 2017, 8 pages.
Cimpoi et al., "Describing Textures in the Wild", 2014 IEEE Conference on Computer Vision and Pattern Recognition, 2014, 8 pages.
Das et al., "DewarpNet: Single-Image Document Unwarping With Stacked 3D and 2D Regression Networks", 2019 IEEE/CVF International Conference on Computer Vision (ICCV), 2019, pp. 131-140.
Dubrofsky, Elan, "Homography Estimation", A Master's Essay Submitted in Partial Fulfillment of the Requirements for the Degree of Master of Science, The University of British Columbia, Mar. 2009, 32 pages.
Dwibedi et al., "Cut, Paste and Learn: Surprisingly Easy Synthesis for Instance Detection", The IEEE International Conference on Computer Vision (ICCV), Aug. 2017, 11 pages.
Hartley et al., "Multiple View Geometry in Computer Vision", Second Edition, Cambridge University Press, Mar. 2004, 673 pages.
Jagannathan et al., "Perspective Correction Methods for Camera-Based Document Analysis", Center for Visual Information Technology, International Institute of Information Technology, 2005, pp. 148-154.
Javed et al., "Real-time Document Localization in Natural Images by Recursive Application of a CNN", 2017 14th IAPR International Conference on Document Analysis and Recognition, IEEE, 2017, pp. 105-110.
Kingma et al., "ADAM: A Method for Stochastic Optimization", Published as a conference paper at the 3rd International Conference for Learning Representations, 2015, pp. 1-15.
Korber, Nikolai, "Improving Camera-based Document Analysis with Deep Learning", Conference: International Conference on Applied Informatics, May 2019, 13 pages.
Lai et al., "Fast and Accurate Image Super-Resolution with Deep Laplacian Pyramid Networks", IEEE Transactions on Pattern Analysis and Machine Intelligence, Aug. 2018, pp. 1-16.
Liang et al., "Geometric Rectification of Camera-captured Document Images", IEEE Transactions on Pattern Analysis and Machine Intelligence, Jul. 6, 2006, pp. 1-32.
Ma et al., "DocUNet: Document Image Unwarping via A Stacked U-Net", 2018 IEEE/CVF Conference on Computer Vision and Pattern Recognition, Jun. 2018, 10 pages.
Marzal et al., "Computation of Normalized Edit Distance and Applications", IEEE Transactions on Pattern Analysis and Machine Intelligence, vol. 15, No. 9, Sep. 1993, pp. 926-932.
Nayef et al., "SmartDoc-QA: A Dataset for Quality Assessment of Smartphone Captured Document Images—Single and Multiple Distortions", CBDAR Workshop @ 2015 13th International Conference on Document Analysis and Recognition (ICDAR), IEEE, 2015, pp. 1231-1235.
Nguyen et al., "Unsupervised Deep Homography: A Fast and Robust Homography Estimation Model", IEEE, Feb. 2018, 8 pages.
Paszke et al., "PyTorch: An Imperative Style, High-Performance Deep Learning Library", 33rd Conference on Neural Information Processing Systems (NeurIPS 2019), Dec. 2019, pp. 1-12.
Ronneberger et al., "U-Net: Convolutional Networks for Biomedical Image Segmentation", Conference International Conference on Medical Image Computing and Computer-Assisted Intervention, May 2015, pp. 1-8.
Shafait et al., "Document Image Dewarping Contest", 2nd Int. Workshop on Camera-Based Document, 2007, pp. 181-188.
Shemiakina et al., "Fast Projective Image Rectification for Planar Objects with Manhattan Structure", Conference Twelfth International Conference on Machine Vision, Jan. 2020, 9 pages.
Skoryukina et al., "Fast method of ID documents location and type identification for mobile and server application", 2019 International Conference on Document Analysis and Recognition (ICDAR), 2019, pp. 850-857.
Song et al., "Sun RGB-D: A RGB-D Scene Understanding Benchmark Suite", Proceedings of 28th IEEE Conference on Computer Vision and Pattern Recognition (CVPR2015), Jun. 2015, 10 pages.
Su et al., "Robust Document Image Binarization Technique for Degraded Document Images", IEEE Transactions on Image Processing, vol. 22, No. 4, Apr. 2013, pp. 1408-1417.
Sun et al., "Deep High-Resolution Representation Learning for Human Pose Estimation", CVPR, Feb. 2019, 12 pages.
Sun et al., "High-Resolution Representations for Labeling Pixels and Regions", Project: High-Resolution Representation, Apr. 2019, 13 pages.
Takezawa et al., "Robust perspective rectification of camera-captured document images", 2017 14th IAPR International Conference on Document Analysis and Recognition, 2017, pp. 27-32.
Tensmeyer et al., "Robust Keypoint Regression", 2019 International Conference on Document Analysis and Recognition Workshops (ICDARW), 2019, pp. 1-7.
Wang et al., "Multi-Scale Structural Similarity for Image Quality Assessment", 37th IEEE Asilomar Conference on Signals, Systems and Computers, Nov. 2003, 5 pages.
Xie et al., "Holistically-Nested Edge Detection", International Journal of Computer Vision, Oct. 2015, pp. 1-10.
Xiong, Ying, "Fast and Accurate Document Detection for Scanning", Dropbox.Tech, Aug. 9, 2016, pp. 1-16.
Yan et al., "Deep transformer: A framework for 2D text image rectification from planar transformations", Neurocomputing, vol. 289, 2018, pp. 32-43.
Zhang et al., "Restoration of Curved Document Images through 3D Shape Modeling", Proceedings of the 2004 IEEE Computer Society Conference on Computer Vision and Pattern Recognition (CVPR'04), 2004, 6 pages.
Zhu et al., "Coarse-to-fine document localization in natural scene image with regional attention and recursive corner refinement", International Journal on Document Analysis and Recognition (IJDAR), 2019, vol. 22, pp. 351-360.
Zhu et al., "Quaternion Convolutional Neural Networks", ECCV 2018, 2018, pp. 1-17.

\* cited by examiner

MACHINE LEARNING MODELS FOR DIRECT HOMOGRAPHY REGRESSION FOR IMAGE RECTIFICATION

BACKGROUND

Enterprises are generating and utilizing more data than ever before. Trying to determine what data is relevant from that data is a non-trivial task. The data may include images, such as scanned documents. Traditional solutions may rely on extracting data from images through manual data entry that is slow and expensive or through simple optical character recognition (OCR) techniques that requires manual customization or configuration.

BRIEF DESCRIPTION OF DRAWINGS

Various embodiments in accordance with the present disclosure will be described with reference to the drawings, in which.

DETAILED DESCRIPTION

Figure 1:
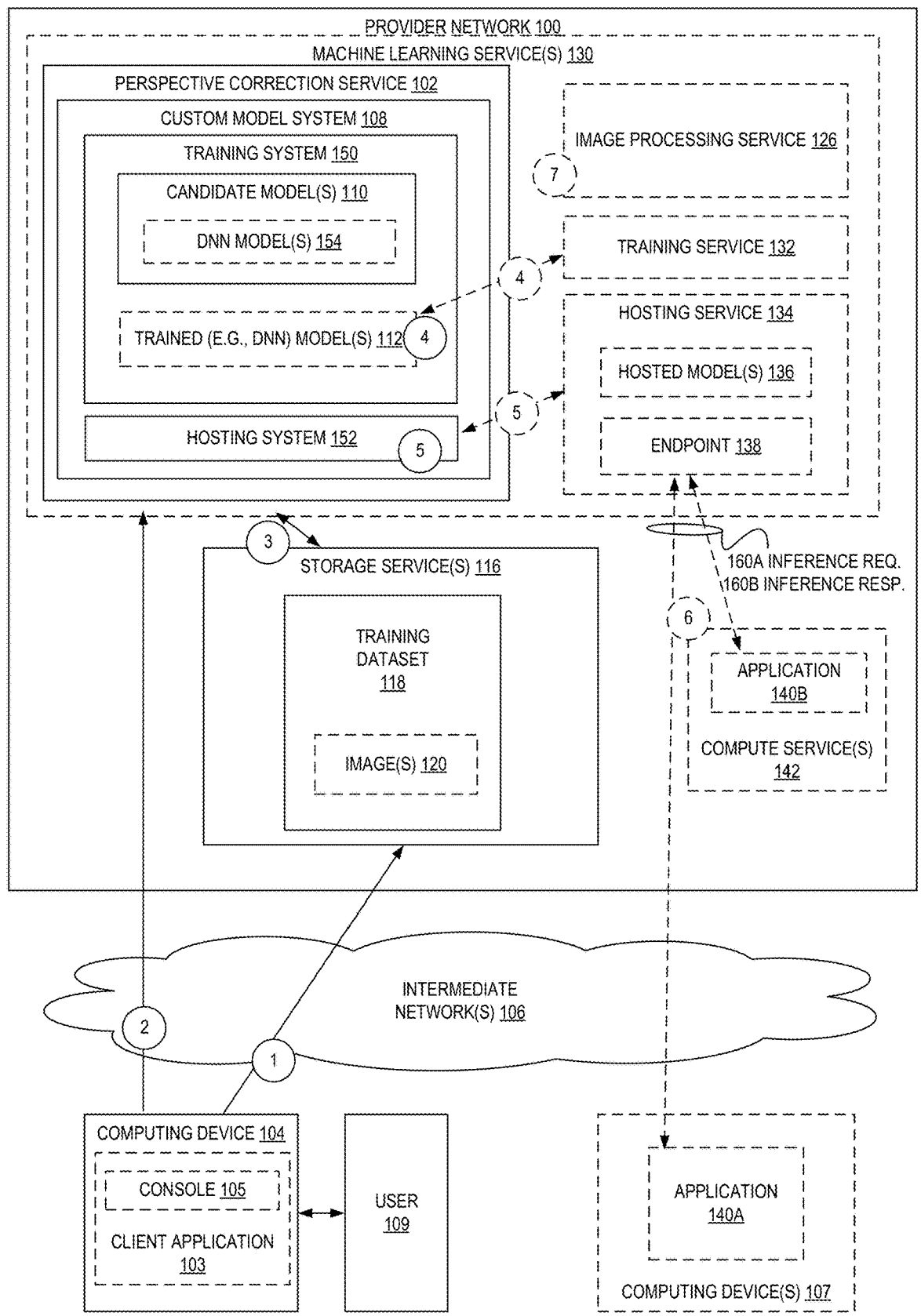
FIG. 1 is a diagram illustrating an environment for creating, training, and using a machine learning model that generates homography data according to some embodiments.

The present disclosure relates to methods, apparatus, systems, and non-transitory computer-readable storage media for creating machine learning (ML) models that generate homography data (e.g., a homography matrix) from a single image. With the near universal availability of mobile phones, taking a picture of a document using a camera has replaced scanning as the mode of input to capture (e.g., store) documents digitally for many users. However, these camera captured images (e.g., of documents) may not be amenable for further processing using downstream systems (such as optical character recognition (OCR)) due to perspective distortions introduced by the camera, pose and orientation variability, and poor lighting. Certain approaches to pre-process camera captured documents to make them suitable for OCR rely on identifying the four corners of the document in the image to rectify and crop out the document region from the other (e.g., irrelevant) region(s). These approaches are not robust, and often fail to rectify the document accurately when one or more of the corners are not visible. Embodiments herein accurately estimate the homography to rectify the document directly from the image without relying on corner detection, by using a machine learning model, such as, but not limited to, a deep neural network (DNN), e.g., a convolutional neural network (CNN). In certain embodiments, isotropic scaling is used to normalize the homography data (e.g., matrix), and learn it as the output of the machine learning model. Certain embodiments use a novel loss function that combines a Charbonnier distance with the difference of Frobenius norms between the known or estimated (e.g., training data) homography and the machine learning model's predicted homography. In certain embodiments, a machine learning model is trained using a synthetically generated dataset obtained by warping a set of upright documents and then embedding them in arbitrary backgrounds. The embodiments herein rectify documents more accurately than corner-based methods, e.g., and improve document unwarping (e.g., dewarping), rectification, OCR accuracy and/or segmentation accuracy.

The ubiquity of digital cameras (e.g., in mobile phones) has made it cost-effective and convenient to take pictures of documents for the purposes of digital record keeping and sharing. As a result, receipts, checks, forms, agreements, and other documents are increasingly captured using cameras rather than (e.g., flatbed) scanners. However, unlike scanned images of documents, images captured using digital cameras suffer from various quality issues such as low resolution, perspective distortion, pose variability, and cluttered backgrounds. Due to these factors, it is very challenging to perform downstream tasks (such as optical character recognition (OCR)) directly on camera captured documents (e.g., images of those documents), making it difficult to digitize and extract value from the rapidly increasing corpora of document images.

One approach for use on camera captured document images is to first correct the perspective distortion and transform the document region to an upright, canonical configuration (e.g., view) that is fronto-parallel. This canonical representation (e.g., view) of the document can then be passed to downstream tasks such as, but not limited to, OCR. Certain embodiments of these approaches for perspective correction localize documents using key points (e.g., the four corners of each page of a document having one or more pages) and establish correspondences to the canonical configuration by estimating homography with respect to the desired fronto-parallel view of the document. These methods may implement deep convolutional neural networks trained to detect document corners as key points. However, the reliance on corners makes such approaches brittle, and they often fail when one or more corners are not visible. Further, certain of these corner-based approaches ignore the rich cues found in the rest of the document such as the actual text, words, and lines, and thus have poor performance in rectifying documents.

Another approach for use in making camera captured images more amenable to OCR focuses on dewarping to correct non-planar, physical distortions such as crumples and folds in the document itself. Certain methods for dewarping rely on the estimation of a backward map to correct the distortions in the document, e.g., by predicting a deformation field that when inverted provides a document that is nearly planar. Certain methods first model the document deformation field and then use the field to estimate a robust backward map using another model. A major shortcoming of these dewarping approaches is that they assume that the document is successfully localized and free from perspective distortion prior to dewarping which is often not realistic or error free with documents captured using cameras, e.g., from varying points of view.

Embodiments herein overcome the above issues with a novel approach to performing perspective correction by recovering homography from an (e.g., single) image. Certain embodiments herein are a key point free approach to directly regress the full homography used to obtain the canonical document representation from the image as the output of a machine learning model, e.g., a CNN model. Certain embodiments herein achieve this by directly regressing each term of the transformation and disentangle the geometric space with use of quaternion layers, e.g., as discussed further below in reference to FIG. 3. By considering the entire image as input, certain embodiments herein allow the model (e.g., deep CNN model) to learn a rich set of cues directly from the pixels of the image (e.g., including text, words, lines, etc.) to estimate the homography, making it robust even when some parts of the document, especially the corners, are missing. Certain embodiments herein utilize a novel pipeline to pre-process document images by combining (1) perspective correction and (2) document dewarping as discussed in reference to FIG. 4. The embodiments herein may be utilized to perform various downstream tasks, such as OCR. The embodiments herein may be used to perform a real-time (e.g., as perceived by a user) inference that generates homography data (e.g., a homography matrix). In one embodiment, this enables a user to utilize a picture of a document (e.g., a check) without requiring alignment of the camera and the document into a predetermined view, e.g., without using an alignment guide.

Embodiments herein directly estimate the homography matrix to be used from a single input image. These embodiments may be used to rectify and make upright document images that have been acquired using devices such as (e.g., flatbed) scanners or (e.g., mobile) cameras. In a flatbed scanner, the document may undergo only in-plane (e.g., two-dimensional) rotation. However, rectifying camera-captured documents is generally more challenging, because of perspective distortion, uncontrolled lighting, and physical deformation, e.g., caused by three-dimensional variability of the image captured by the camera.

Embodiments for rectifying documents may use different approaches for scanned images versus (e.g., mobile) camera captured images. For certain embodiments of scanned images, a two-stage approach is used with the first stage correcting for large rotation, followed by a second stage to make fine grained correction to the rotation. For certain embodiments of (e.g., mobile device) camera captured images, the method may attempt to detect the four corners of the document in an image, then estimate a homography matrix from these four corners and warp it to a canonical view. Certain embodiments herein remove the intermediate step of finding corners, and directly regresses the homography matrix from a single document image without relying on key points, e.g., without relying on the accurate detection of the document corners that exhibits poor performance when one or more corner(s) are absent and/or when the document in question has folded/missing corners. In contrast to a four-point parameterization, certain embodiments herein are not limited to use for documents (or other information that is to be detected) in an image that are polygonal in shape with at least four corners.

Certain embodiments herein determine a homography matrix with a machine learning model as discussed herein, e.g., without decomposing the homograpy matrix into affine and perspective parts and regressing the values in two separate stages, but by directly estimating the (e.g. nine) entries of the homography matrix. A homography matrix may be a 3×3 matrix that mixes the rotation, translation, scale, perspective, and shear components (e.g., or any one thereof or any combination thereof) of a homography transformation.

However, a change (e.g., in the order of $10^{-3}$) to the perspective (e.g., skew) entries (e.g., h31 and h32) of the homograph matrix may result in an incomprehensible image. Certain embodiments herein overcome this limitation by applying a similarity transform (e.g., anisotropic scaling) to normalize the homography matrix which in turn reduces variance of each term. This normalization results in a homography matrix which can be regressed as the output of a machine learning model (e.g., deep neural network). In certain embodiments, a machine learning model has a deep neural network architecture that uses quaternion embeddings to speed up training and obtain higher accuracy. A quaternion may generally be represented in the form of $a+b*i+c*j+d*k$, where a, b, c, and d are real numbers, and i, j, and k are the fundamental quaternion units.

Certain embodiments herein formulate a loss function to enable robust regression and a norm matching loss to avoid prediction of a degenerate homography matrix. Certain embodiments of this architecture (e.g., which does not rely on key points/corners) is capable of rectifying scanned as well as mobile captured documents with greater accuracy compared to other methods, e.g., which often fail in an unconstrained ("wild") setting. Certain embodiments herein utilize a direct homography estimation approach that is more robust to missing corners, occlusion, and has better performance in terms of OCR accuracy, e.g., even with (e.g., 8 times) less training data than corner-based methods.

Certain embodiments herein are utilized within a document processing pipeline with support for document images captured using cameras, for example, in the perspective correction stage that fixes distortions due to camera view (e.g., as a precursor to a page dewarping stage).

In certain embodiments, the lack of a reference image poses a significant challenge to the perspective correction of camera captured documents. Where there is no reference image, one approach is to assume the desired canonical upright image as the reference to extract correspondences between the input document image (e.g., from the camera) and this canonical reference and estimate the homography that will take the former to the latter. The quality of such methods relies on the robustness of extracted correspondences and may be subdivided into two groups. The first group of methods makes assumptions about the image acquisition process and uses low level features to infer and undo perspective distortion. These methods may include utilizing special hardware that uses shading information present in the image in order to undo the distortion. These methods may rely on low level cues such as document layout, edges, and text lines to impose a set of constrains and solve for the homography transform. These methods may include using text lines and vanishing points to estimate an affine transform which is followed by a method that uses text snakes and projection profiles to accurately estimate the homography matrix. As they depend on low-level features, these methods are not robust enough for real world unconstrained capture settings and perform poorly when there is noise, occlusion, blur, illumination, and scale variations. The second group of methods localize document corners using a machine learning model and make no assumptions about the image content or capture environment. The corners in these methods may thus serve two important tasks: (i) to provide a way to compute homography and (ii) to be used to approximate dimensions of the document. The methods may include a recursive CNN model extending the task of corner localization by following a coarse to fine strategy where the first stage detects coarse corner locations and is refined by recursively using a specialized corner module. These methods may include randomly removing some corners or setting them outside the image boundary to improve performance and robustness to occlusion. These methods may include detecting the document boundaries using holistically nested edge detection followed by contour approximation to fit a four-point polygon over the edges, e.g., where this polygon provides the document corners that are used to estimate the homography. These methods may adopt a four-point homo'lgraphy parametrization and rely on the robustness of extracted corners. This is especially problematic when one of the corner(s) is missing and/or when the document contains folds/crumples leading to spurious corner detection which can cause inaccurate homography estimation. To overcome issues with key points (e.g., corners), certain embodiments utilize a two-step method to learn the homography transformation by decomposing it into affine and perspective parts.

Certain embodiments herein do not utilize the above methods, for example, certain embodiments herein do not split the homography determination (e.g., computation) into two stages to first estimate the perspective correction, followed by an affine correction, for example, certain embodiments herein are not limited to the kinds of transformations that can be modeled by these two stages. Certain embodiments herein jointly address distortions caused during the acquisition process by directly estimating a homography that transforms the input document to a fronto-parallel view in a single step (e.g., stage). Next is a discussion of direct homography parameterization and normalization.

Using conventional notation, the homography matrix that will transform a given document image to the desired fronto-parallel upright pose may be denoted as (e.g., non-normalized) homography matrix H, which can be written as:

$$H = \begin{bmatrix} h_{11} & h_{12} & h_{13} \\ h_{21} & h_{22} & h_{23} \\ h_{31} & h_{32} & h_{33} \end{bmatrix} \quad (1)$$

In certain embodiments, the non-normalized $h_{31}$ and $h_{32}$ entries take a value that is about 10^−4 and/or the non-normalized $h_{13}$ and $h_{23}$ entries take a value that is greater than zero.

Given two views of a scene (e.g., a document in that scene), one approach to estimate a homography matrix that transforms one view to the other view (see, e.g., FIG. 2) is to identify a set of correspondences between the two views and then compute the homography from this set, e.g., using a direct linear transform. Let the two points (e.g., measured in pixels) that correspond to each other in the source and target views be denoted as $x=(u, v, 1)^T$ and $x'=(u', v', 1)^T$ respectively. The relationship between these two points can be expressed as $$x'=Hx \quad (2)$$

Expanding the terms in (2):

$$\begin{pmatrix} u' \\ v' \\ 1 \end{pmatrix} = \begin{bmatrix} h_{11} & h_{12} & h_{13} \\ h_{21} & h_{22} & h_{23} \\ h_{31} & h_{32} & h_{33} \end{bmatrix} \begin{pmatrix} u \\ v \\ 1 \end{pmatrix} \quad (3)$$

which can be reformulated as a pair of homogeneous linear equations:

$$-h_{11}u-h_{12}v-h_{13}+(h_{31}u+h_{32}v+h_{33})u'=0 \quad (4)$$

$$-h_{21}u-h_{22}v-h_{23}+(h_{31}u+h_{32}v+h_{33})v'=0 \quad (5)$$

Collecting the terms of the homography matrix results in:

$$\begin{pmatrix} -u & -v & -1 & 0 & 0 & 0 & u'u & u'u & v'u & u' \\ 0 & 0 & 0 & -u & -v & -1 & v'u & u v' & v & v' \end{pmatrix} \begin{pmatrix} h_{11} \\ \ldots \\ h_{33} \end{pmatrix} = 0 \quad (6)$$

In certain embodiments, the homography matrix H has only 8 degrees of freedom, and can be determined by solving for the terms of the matrix in the system of equations in (6) using (4) correspondences of points that are not collinear, e.g., using singular value decomposition. However, approaches to directly estimate the homography may be unstable and not converge. In order to obtain a more reliable solution, certain embodiments herein utilize a normalization stage to first center the set of points in both source and target views to have zero mean (e.g., and norm $\sqrt{2}$) and then compute the homography. If $T^s$ and $T^t$ are transformations that center the points in the source and target views respectively, and $\overline{H}$ is the homography computed using the centered point correspondences, then the desired homography H relates to $\overline{H}$ as follows:

$$H=(T^t)^{-1}\overline{H}T^s \quad (7)$$

In certain embodiments, both the source view transform ($T^s$) and the target view transform ($T^t$) are of the form of $$\begin{pmatrix} s & 0 & -sx0 \\ 0 & s & -sy0 \\ 0 & 0 & 1 \end{pmatrix}$$

with a scale factor s and translation ($x_0$; $y_0$) that preserves intrinsic relations among coefficients and properties of homography matrix.

Figure 2:
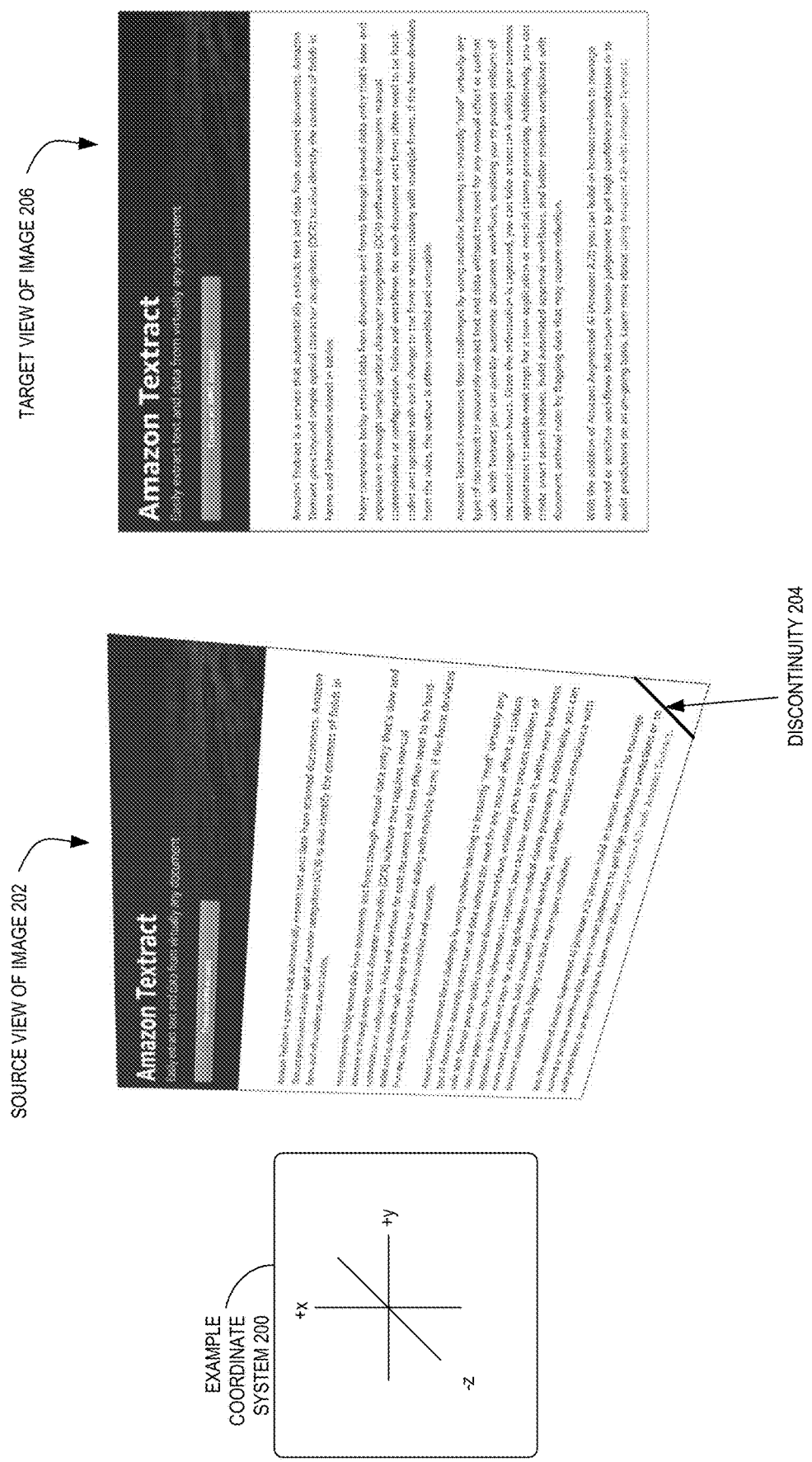
FIG. 2 is a diagram illustrating a source view and a target view for an image according to some embodiments.

To rectify a single document image, certain embodiments consider the source view to be the input document image (e.g., source view 202 in FIG. 2) and the target view is the canonical, fronto-parallel version of the input (e.g., target view 206 in FIG. 2). Then the desired homography is the one that will transform the source view to the target view. If key point correspondences are available, the centering transformations $T^s$ and $T^t$ needed to normalize the homography matrix can be computed precisely in certain embodiments. However, if it is desired to estimate the homography directly from the image as the output of a machine learning model (e.g., deep convolutional neural network model) without using key point correspondences, there is no currently known way to obtain $T^s$ and $T^t$. In this scenario, there are two options—1) estimate the un-normalized original homography matrix H, or 2) use an alternative approach to approximately normalize the homography matrix. However, there are issues using the first approach when the training procedure does not converge on an output (e.g., homography matrix). This instability leads to choosing the latter approach in certain embodiments. Thus, in embodiments herein, a transformation is chosen that performs anisotropic scaling as a function of width (w) and height (h) of the input image and the desired fronto-parallel output image, both of which are fixed to w×h:

$$(T_{direct}^t)^{-1} = T_{direct}^s{}^{-1} = \begin{bmatrix} 2/w & 0 & -1 \\ 0 & 2/h & -1 \\ 0 & 0 & 1 \end{bmatrix} \quad (8)$$

In certain embodiments, applying the transformation $T_{direct}^t$ to the corners of the document in the target view will center the corner coordinates to have zero mean (e.g., and norm $\sqrt{2}$). So, using this transformation, $T_{direct}^t$ is substantially equivalent to normalizing the homography using the corners as keypoint correspondences. However, applying the same transformation $T_{direct}^s$ to the source view is not guaranteed to center the corners of the document in the input image. Certain embodiments herein allow this approximate transformation on the source view to normalize the homography matrix, a step that may be essential for stability and convergence of training to estimate homography matrices using machine learning models (e.g., deep neural networks). Certain embodiments herein interpret the normalization as coordinate scaling that applies different weights to the terms of the loss function, e.g., as discussed further below. Certain embodiments herein train a machine learning model (e.g., deep neural network) to directly regress the terms of the normalized homography matrix $\overline{H}$ (e.g., and then use (7) to obtain the desired (e.g., non-normalized) homography H):

$$H=(T_{direct}^t)^{-1}\overline{H}T_{direct}^s \quad (9)$$

In certain embodiments, t=s is assumed for use of a machine learning model, but the actual t and s are used during the training of the machine learning model.

In certain embodiments, each image is normalized by placing the origin of the coordinate system at the center (e.g., the document's center). In certain embodiments, each element of the normalized homography matrix $\overline{H}$ is limited to being a value in a range (e.g., a range of 0 to 1).

In certain embodiments, in the training of a machine learning model that is to output a normalized homography matrix $\overline{H}$ for an input image, the model is provided one or more training datasets of: a source view of an image, a target view of that image, and the corresponding normalized homography matrix $\overline{H}$ and/or corresponding (e.g., non-normalized) homography H. In certain embodiments, in the training of a machine learning model that is to output a normalized homography matrix $\overline{H}$ for an input image, the model is provided (e.g., only) one or more training datasets of: (i) a source view of an image and (ii) the corresponding normalized homography data (e.g., matrix $\overline{H}$) or corresponding non-normalized homography data (e.g., matrix H).

In certain embodiments, in the use of a machine learning model that is to output normalized homography matrix $\overline{H}$ for an input image, the model is provided an input of a source view for an (e.g., non-normalized) input image. In one embodiment, the output (predicted) normalized homography matrix $\overline{H}$ is used in (7) (e.g., assuming s=t) to determine the corresponding (e.g., non-normalized) homography H and the source view of the input image (e.g., "x" in (2) above) is used with the corresponding (e.g., non-normalized) homography H to determine the target view (e.g., points and/or pixels thereof) of the input image (e.g., "x'" in (2) above). In one embodiment, a pixel value includes red, green, and blue (RGB) components that each uses a certain number of bits, e.g., 8 bits each which have integer values from 0 to 255.

FIG. 1 is a diagram illustrating an environment for creating, training, and using a machine learning model that generates homography data (e.g., matrix) according to some embodiments. FIG. 2 is a diagram illustrating a source view 202 and a target view 206 for an image according to some embodiments. The example coordinate system 200 includes an x, y, and z component. As discussed further below, the origin (e.g., (0, 0, 0)) of the coordinate system may be positioned in an image according to the (e.g., normalization) methods discussed herein. Source view 202 may include a discontinuity 204, for example, a fold as discussed herein that creates more than four corners (e.g., five or more corners) for the document or other area of interest in the image.

FIG. 1 includes a perspective correction service 102, one or more storage services 116, one or more machine learning services 130, and one or more compute services 142 implemented within a multi-tenant provider network 100. Each of the perspective correction service 102, one or more storage services 116, one or more machine learning services 130, and one or more compute services 142 may be implemented via software, hardware, or a combination of both, and may be implemented in a distributed manner using multiple different computing devices.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 142), a storage service 116 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s), such as through use of application programming interface (API) calls, via a console 105 implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service (which may be one of compute service(s) 142) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 140B) that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The perspective correction service 102, in some embodiments, is a machine learning powered service that generates a normalized homography matrix $\overline{H}$ for an input of a source view of an image (e.g., source view 202 in FIG. 2). The source view and/or target view may be data (e.g., picture elements or pixels) that represent a view. For example, users may use the perspective correction service 102 to output the source view of the input image, e.g., for further processing within the provider network 100 and/or on a computing device 107 (e.g., a mobile phone including a camera). The perspective correction service 102, in some embodiments, is trained to generate a normalized homography matrix $\overline{H}$ for an input of a source view of an image. In certain embodiments, the normalized homography matrix $\overline{H}$ is used to determine a target view of the image, e.g., as used by image processing service 126. Image processing service 126 may include OCR. Image processing service 126 may include using natural language processing (NLP) techniques to automatically identify the language of the text (e.g., where one language has a reading direction from right to left and another, different language has a reading direction from left to right), extract key phrases, places, people, brands, or events; understand positive or negative sentiment; and/or automatically organize a collection of text files by topic. In some embodiments, the perspective correction service 102—via use of a custom model system 108—allows users to build and use model(s) 112. The custom model system 108 may obtain, e.g., from a user 109 or otherwise, a relatively small training dataset 118 (for example, image(s) 120), and then train a (e.g., DNN) model 112 to generate a normalized homography matrix $\overline{H}$ for an input of a source view of an image (e.g., an image from a user), without requiring the user 109 to manage servers, implement particular algorithms, etc.

The custom model system 108, for example, may additionally or alternatively enable users to build model(s) 112 using their domain (or business) specific training dataset 118 (e.g., images 120) without needing to manage servers, understand ML techniques, etc. With output from model(s) 112, users may thus easily build image processing applications with greater accuracy.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models 110 and respective configurations. Training may perform a grid search over the matrix of experiments (e.g., defined upfront) in search for the model and its parameters that performs best on the given dataset.

Thus, a user 109 may provide or otherwise identify training dataset 118 (e.g., a source view of an image 120, and the corresponding normalized homography $\bar{H}$ and/or corresponding (e.g., non-normalized) homography H) for use in creating model(s) 112. In one embodiment, candidate DNN model 154 is as discussed in reference to FIG. 3 herein.

As one example use, as shown at circle (1), the user 109 (e.g., an image processing provider) may utilize a client application 103 executed by a computing device 104 (e.g., a web-application implementing a console 105 for the provider network 100, a standalone application, another web-application of another entity that utilizes the perspective correction service 102 as a part of its backend, a database or mixed-SQL environment, etc.) to cause the computing device 104 to upload the training dataset 118 to a storage location (e.g., provided by a storage service 116 such as an object storage service of a provider network 100).

The dataset 118 may be one or more sets of a source view of an image 120 and the corresponding normalized homography $\bar{H}$ and/or corresponding (e.g., non-normalized) homography H. The images may be represented as pixels, e.g., in any format.

Thereafter, at circle (2) the computing device 104 may issue one or more requests (e.g., API calls) to the perspective correction service 102 that indicate the user's 109 desire to train a model(s) 112. The request may be of a type that identifies which type of model is to be created, e.g., CreateDNNModel for creating a trained DNN model 112. The request may also include one or more of an identifier of a storage location or locations storing the training dataset 118 (e.g., an identifier of one or more sets of a source view of an image 120 and the corresponding normalized homography $\bar{H}$ and/or corresponding (e.g., non-normalized) homography H), which may identify a storage location (e.g., via a Uniform Resource Locator (URL), a bucket/folder identifier, etc.) within the provider network 100 (e.g., as offered by a storage service 116) or external to the provider network 100, a format identifier of the training dataset (e.g., image format) 118, etc. In some embodiments, the request includes the training dataset 118 within the request.

Responsive to receipt of the request, the custom model system 108 of the perspective correction service 102 is invoked and begins operations for training the corresponding type of model. For example, the custom model system 108 may identify what type of model is to be trained (e.g., via analyzing the method call associated with the request), the storage location(s) associated with the training dataset 118, etc. Thus, the custom model system 108 may retrieve any stored training dataset 118 (e.g., set 120) as shown at circle (3), which may be from a storage location within the provider network 100 or external to the provider network 100.

In some embodiments, the training (at circle (4)) of the model(s) 112 includes use (at optional, dotted circle (4)) of a separate training service 132 of a machine learning service 130 described later herein to perform a particular training job or hyperparameter optimization tuning job for a model, or the like; similarly, the hosting system 152 of the custom model system 108 may make use (at optional, dotted circle (5)) of a hosting service 134 of a machine learning service 130 to deploy a model as a hosted model 136 in association with an endpoint 138 that can receive inference requests from client applications 140A and/or 140B at circle (6), provide the inference requests 160A to the associated hosted model(s) 136, and provide inference results 160B (e.g., predicted normalized homography matrix $\bar{H}$ (or data based on the homography matrix) back to applications 140A and/or 140B, which may be executed by one or more computing devices 107 outside of the provider network 100 or by one or more computing devices of a compute service 142 (e.g., hardware virtualization service, serverless code execution service, etc.) within the provider network 100. Candidates model(s) 110 may include a DNN model(s) 154, e.g., a deep CNN model. In certain embodiments, the results 160B include a predicted normalized homography matrix $\bar{H}$ for an input image, a predicted non-normalized homography matrix H for the input image, the target view determined for the input image, any one of these, or any combination of these.

In some embodiments, the machine learning service(s) 130 may further use image processing service 126, as reflected by optional circle (7).

Next is a discussion of an example model architecture used to regress homography.

Figure 3:
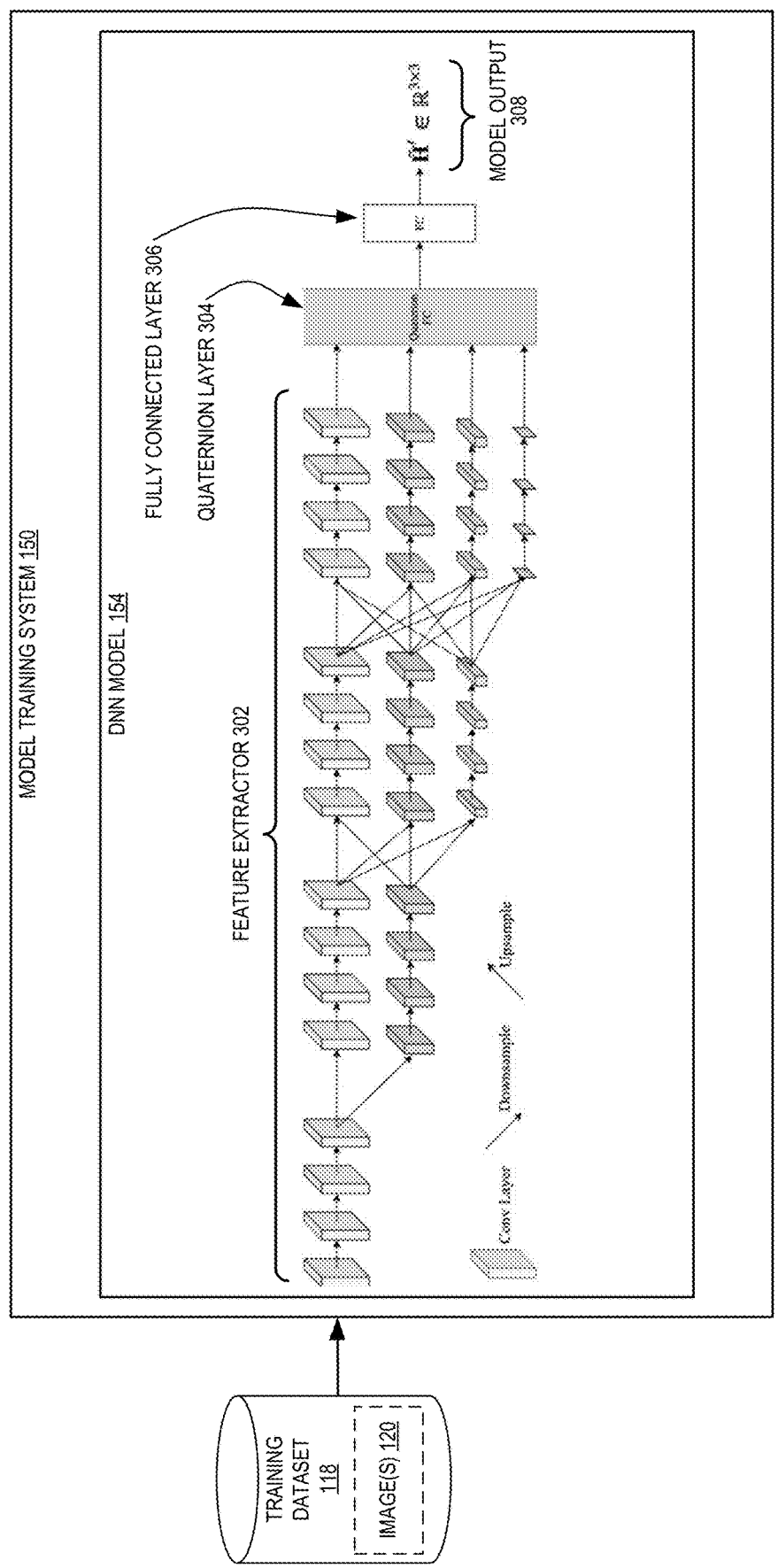
FIG. 3 is a diagram illustrating a model training system for training a deep neural network (DNN) model according to some embodiments.

FIG. 3 is a diagram illustrating a model training system 150 for training a deep neural network (DNN) model 154 according to some embodiments. As depicted, model training system 150 takes an input of training dataset 118 and trains a DNN model 154 (e.g., algorithm) to generate a desired model output 308, e.g., an output of a normalized homography matrix $\bar{H}$ for an input of a source view of an image (e.g., data representing the source view 202 in FIG. 2). Depicted model 154 includes a plurality of convolutions that form a feature extractor 302 that fuses intermediate outputs at multiple scales, coupled to a quaternion layer 304, that is coupled to a fully connected layer 306. It one embodiment, convolution preserves the relationship between pixels by learning image features using small areas (e.g., squares) of input data.

In certain embodiments, the use of a quaternion layer 304 helps in disentangling the learned features and enforces normalization by projecting features onto a unit sphere in the quaternion domain H. For a D-dimensional (e.g., D=2048) quaternion vector, $\hat{a}=[\hat{a}_i]\in \mathbb{H}^D$, for i=1; 2; 3 . . . D. In one embodiment, quaternion layer 304 applies 1-dimensional quaternion filtering kernels, such that, $\hat{w}^m=[\hat{w}_i^m]\in \mathbb{H}^M$ for m=1, . . . , M (e.g., M=1024), resulting in $\hat{b}=[\hat{b}_m] \in \mathbb{H}^M$ with elements:

$$\hat{b}_m = \sum_{i=1}^{D} \frac{1}{s_i} \hat{w}_i^m \hat{a}_i \hat{w}_i^{m*}, \tag{10}$$

where $s_i$ is the magnitude of $\hat{w}_i^m$ with its complex conjugate $\hat{w}_i^{m*}$. In certain embodiments, the output of the quaternion layer 304 is passed through a real valued fully connected layer 306 to regress the (e.g., 9) entries of the normalized homography matrix H'. In one embodiment, model 154 takes in image I$\in \mathbb{R}^{256\times 256\times 3}$ and outputs normalized homography matrix $\bar{H}'\in \mathbb{R}^{3\times 3}$. In certain embodiments, an input image I$\in \mathbb{R}^{w\times h\times 3}$ is resized such that I$\in \mathbb{R}^{256\times 256\times 3}$ before sending to the model 154. The values herein (e.g., 256 and 3) are merely examples, and any other integer may be utilized, for example, an image smaller or larger than 256 pixels of width and/or height.

In certain embodiments, a loss function is used to train a model. In one embodiment of training, a combination of Charbonnier and Frobenius Li loss between the normalized prediction (H') and the normalized (e.g., training data) homography (H) transforms are utilized:

$$\mathcal{L}(\overline{H}', \overline{H}) = \alpha \mathcal{L}_{Charbonnier} + (1-\alpha)\mathcal{L}_{Frobenius} \quad (11)$$

$$\mathcal{L}_{Charbonnier}(\overline{H}', \overline{H}) = \frac{1}{N}\sum_{i=1}^{N}\sqrt{(\overline{H}'_i, \overline{H}_i)^2 + \varepsilon^2} \quad (12)$$

$$\mathcal{L}_{Frobenius}(\overline{H}', \overline{H}) = \frac{1}{N}\sum_{i=1}^{N}\left|\|\overline{H}'_i\|_F - \|\overline{H}_i\|_F\right| \quad (13)$$

In one embodiment, the $\mathcal{L}_{Frobenius}$ loss forces the Frobenius norm ($\|.\|_F$) of predicted matrix (H') to match the norm of the normalized (e.g., training data) homography (H) and regularizes the loss by avoiding degenerate matrix predictions for the homography matrix H'. The final loss function L(H',H) in (11) is a linear combination of the two loss terms, e.g., where $\varepsilon=2.0\times10^{-5}$ is added to avoid situations when error is 0. The parameter $\propto$ controls the weighting of each term during the training, for example, which is fixed to be a certain value (e.g., $\propto=0.7$) and is chosen empirically.

Embodiments herein provide a novel approach to directly estimate the homography matrix needed to transform a document image into a canonical fronto-parallel view without relying on corners or key point correspondences. In certain embodiments, normalizing the homography using an anisotropic scaling transformation allows a machine learning model (e.g., deep convolutional neural network) to learn the (e.g., 9) terms of the homography matrix as the output of the model. In one embodiment, a model is trained using a large synthetically generated dataset assembled by randomly distorting documents and pasting them on arbitrary textures and backgrounds. The model may be utilized as a preprocessing step to correct perspective distortions before using dewarping, for example, to provide improved rectification and OCR accuracy over using just dewarping.

Figure 4:
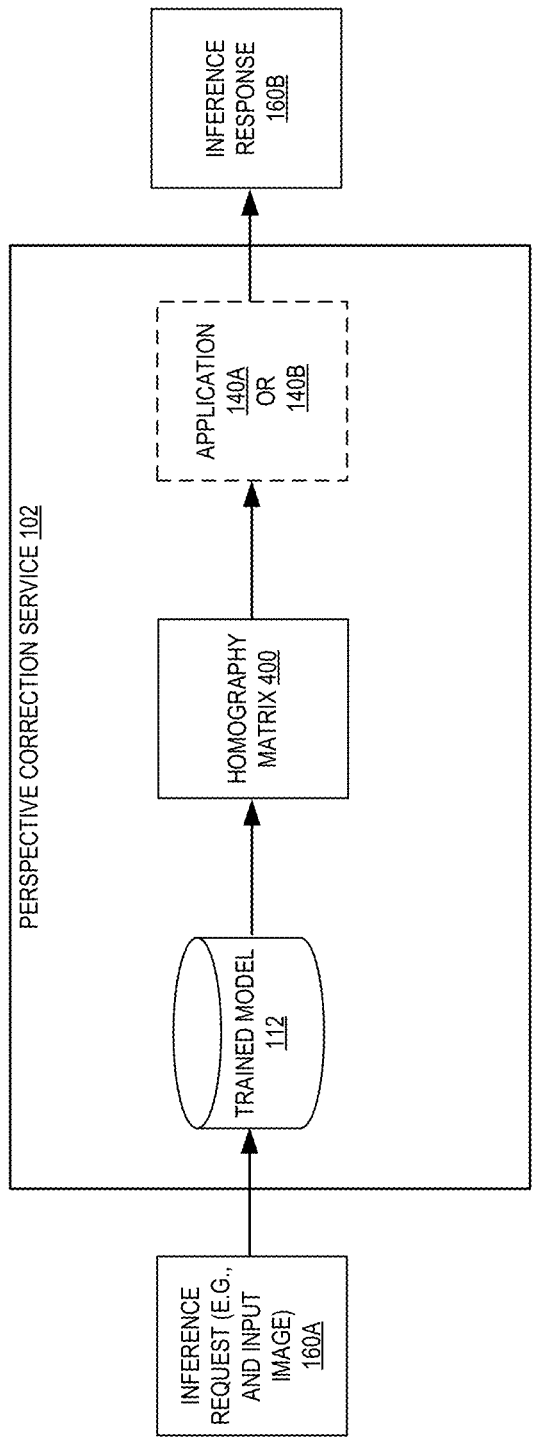
FIG. 4 is a diagram illustrating a perspective correction service that includes a trained model that generates a homography matrix according to some embodiments.

FIG. 4 is a diagram illustrating a perspective correction service 102 that includes a trained model 112 that generates a homography matrix 400 according to some embodiments. In certain embodiments, the perspective correction service 102 takes the predicted (e.g., normalized) homography matrix 400 from trained model 112 for inference request (e.g., and source view of input image) 160A and generates an inference response 160B based at least in part on that predicted (e.g., normalized) homography matrix 400. In one embodiment, application 140A or 140B generates a non-normalized homography matrix from the predicted normalized homography matrix 400. In one embodiment, application 140A or 140B generates a target view of the input image using the predicted (e.g., normalized and/or non-normalized) homography matrix. The target view of the input image may be output as the inference response 160B. Additionally or alternatively, the target view of the input image may be further processed by application 140A or 140B (e.g., OCR performed on text within the target view of the input image) and that resultant provided as inference response 160B. Application 140A or 140B may perform processing on text (e.g., of documents), perform processing on (e.g., two-dimensional and/or three-dimensional) images (e.g., medical images or satellite images), panoramic stitching of images, object detection, face alignment, etc.

Figure 5:
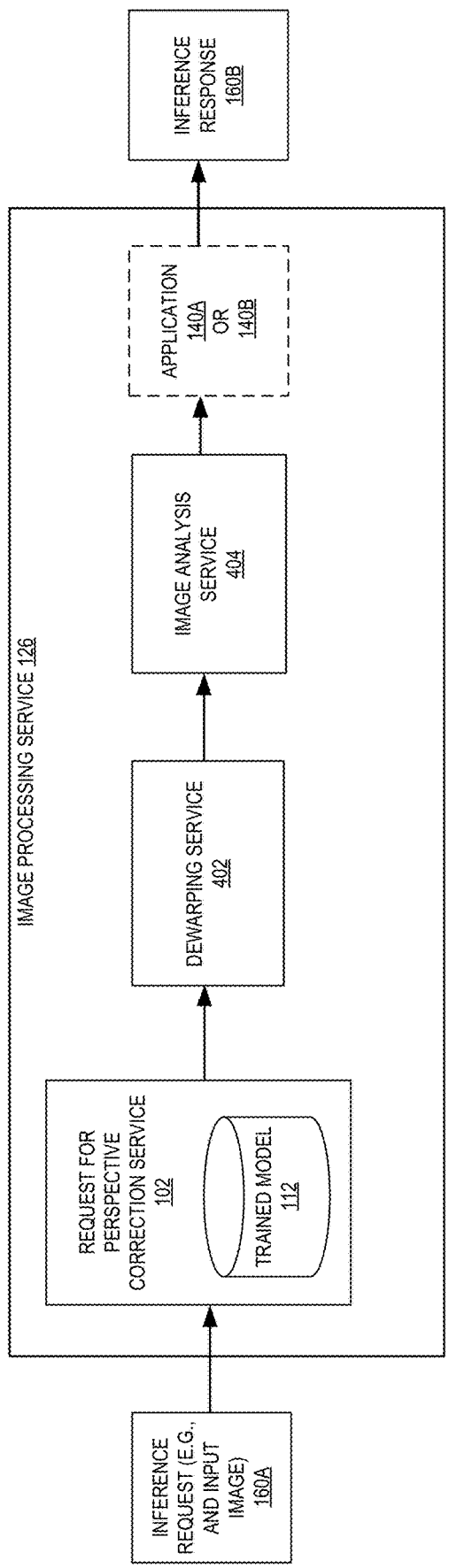
FIG. 5 is a diagram illustrating an image processing service that utilizes a perspective correction service that includes a trained model that generates a homography matrix according to some embodiments.

FIG. 5 is a diagram illustrating an image processing service 126 that utilizes a perspective correction service 102 that includes a trained model 112 that generates a homography matrix according to some embodiments. In certain embodiments, image processing service 126 performs a call (e.g., sends a request) to perspective correction service 102 to generate a predicted (e.g., normalized) homography matrix from trained model 112 for a source view of an input image. In one embodiment, the response from perspective correction service 102 is a target view of the input image. In certain embodiments, the data (e.g., data representing the target view of the input image) from the perspective correction service 102 is sent to a dewarping service 402 to dewarp the data. In certain embodiments, the dewarped data is then sent to image analysis service 404 for further analysis, e.g., OCR, segmentation, etc. The output from image analysis service 404 may be output as the inference response 160B. Additionally or alternatively, the output from image analysis service 404 may be further processed by application 140A or 140B and that resultant provided as inference response 160B. Application 140A or 140B may perform processing on text (e.g., of documents), perform processing on (e.g., two-dimensional and/or three-dimensional) images (e.g., medical images or satellite images), panoramic stitching of images, object detection, face alignment, etc.

Figure 6:
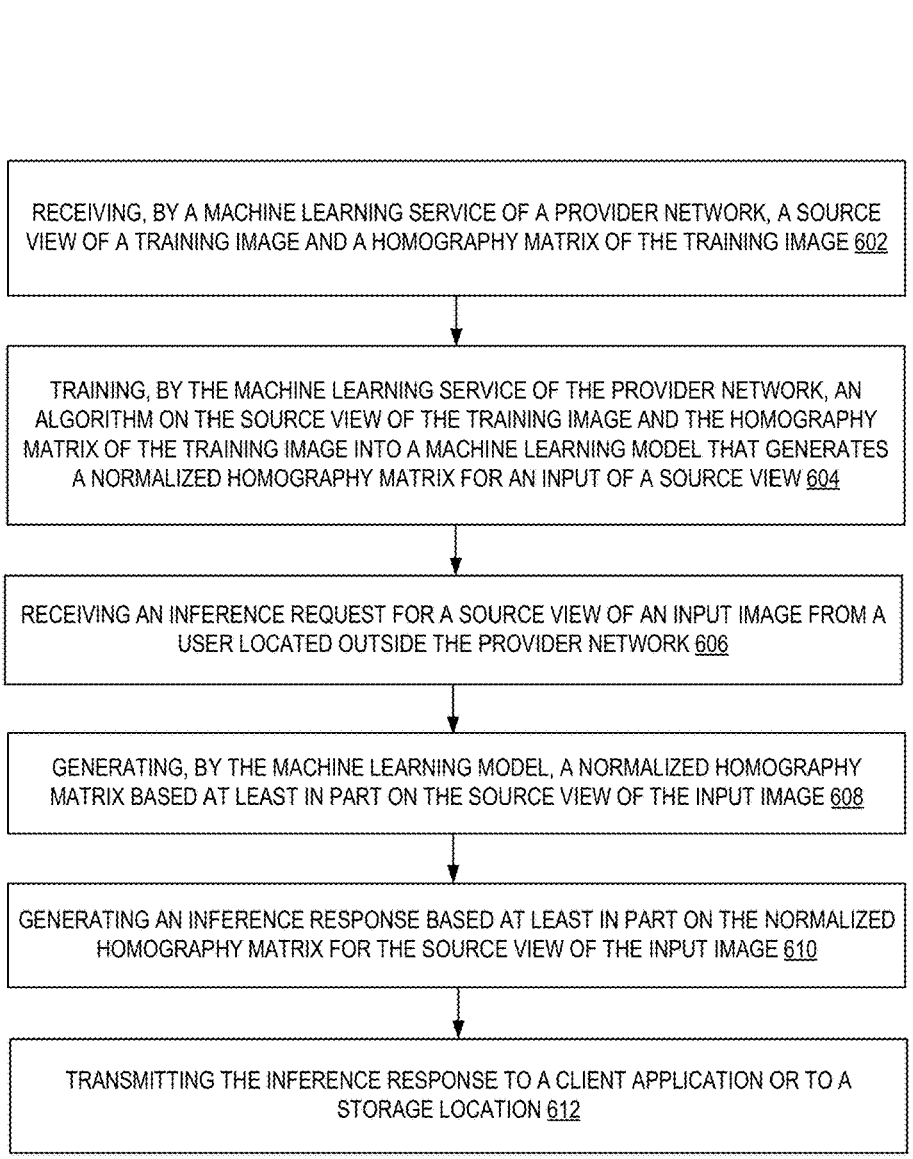
FIG. 6 is a flow diagram illustrating operations of a method for training a machine learning model to generate a normalized homography matrix, and generating an inference based at least in part on the normalized homography matrix according to some embodiments.

FIG. 6 is a flow diagram illustrating operations 600 of a method for training a machine learning model to generate a normalized homography matrix, and generating an inference based at least in part on the normalized homography matrix according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by machine learning service 130 (e.g., implemented in a provider network) of the other figures.

The operations 600 include, at block 602, receiving, by a machine learning service of a provider network, a source view of a training image and a homography matrix of the training image. The operations 600 further include, at block 604, training, by the machine learning service of the provider network, an algorithm on the source view of the training image and the homography matrix of the training image into a machine learning model that generates a normalized homography matrix for an input of the source view. The operations 600 further include, at block 606, receiving an inference request for a source view of an input image from a user located outside the provider network. The operations 600 further include, at block 608, generating, by the machine learning model, a normalized homography matrix based at least in part on the source view of the input image. The operations 600 further include, at block 610, generating an inference response based at least in part on the normalized homography matrix for the source view of the input image. The operations 600 further include, at block 612, transmitting the inference response to a client application or to a storage location.

Figure 7:
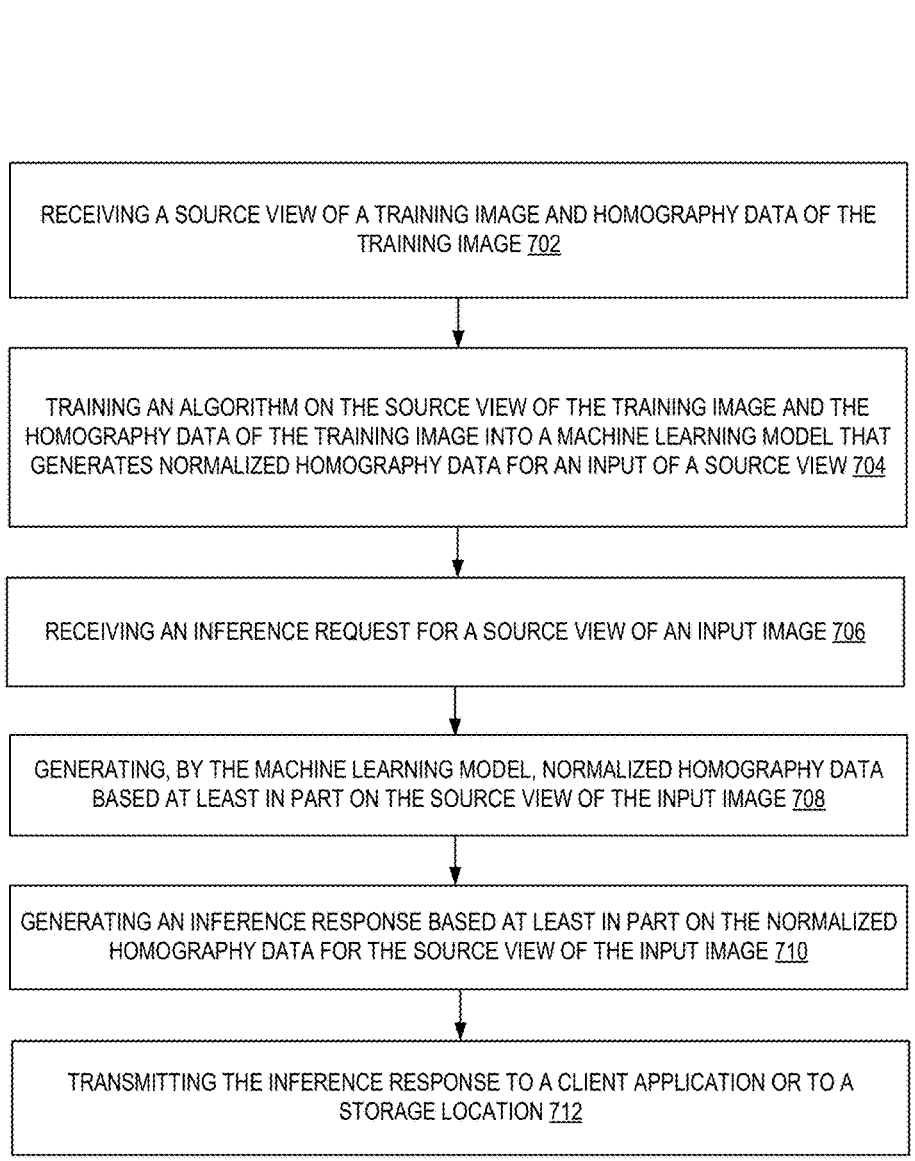
FIG. 7 is a flow diagram illustrating operations of a method for training a machine learning model to generate normalized homography data, and generating an inference based at least in part on the normalized homography data according to some embodiments.

FIG. 7 is a flow diagram illustrating operations of a method for training a machine learning model to generate normalized homography data, and generating an inference based at least in part on the normalized homography data according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by machine learning service 130 (e.g., implemented in a provider network) of the other figures.

The operations 700 include, at block 702, receiving a source view of a training image and homography data of the training image. The operations 700 further include, at block 704, training an algorithm on the source view of the training image and the homography data of the training image into a machine learning model that generates normalized homography data for an input of the source view. The operations 700 further include, at block 706, receiving an inference request for a source view of an input image. The operations 700 further include, at block 708, generating, by the machine learning model, normalized homography data based at least in part on the source view of the input image. The operations 700 further include, at block 710, generating an inference response based at least in part on the normalized homography data for the source view of the input image. The operations 700 further include, at block 712, transmitting the inference response to a client application or to a storage location.

Figure 8:
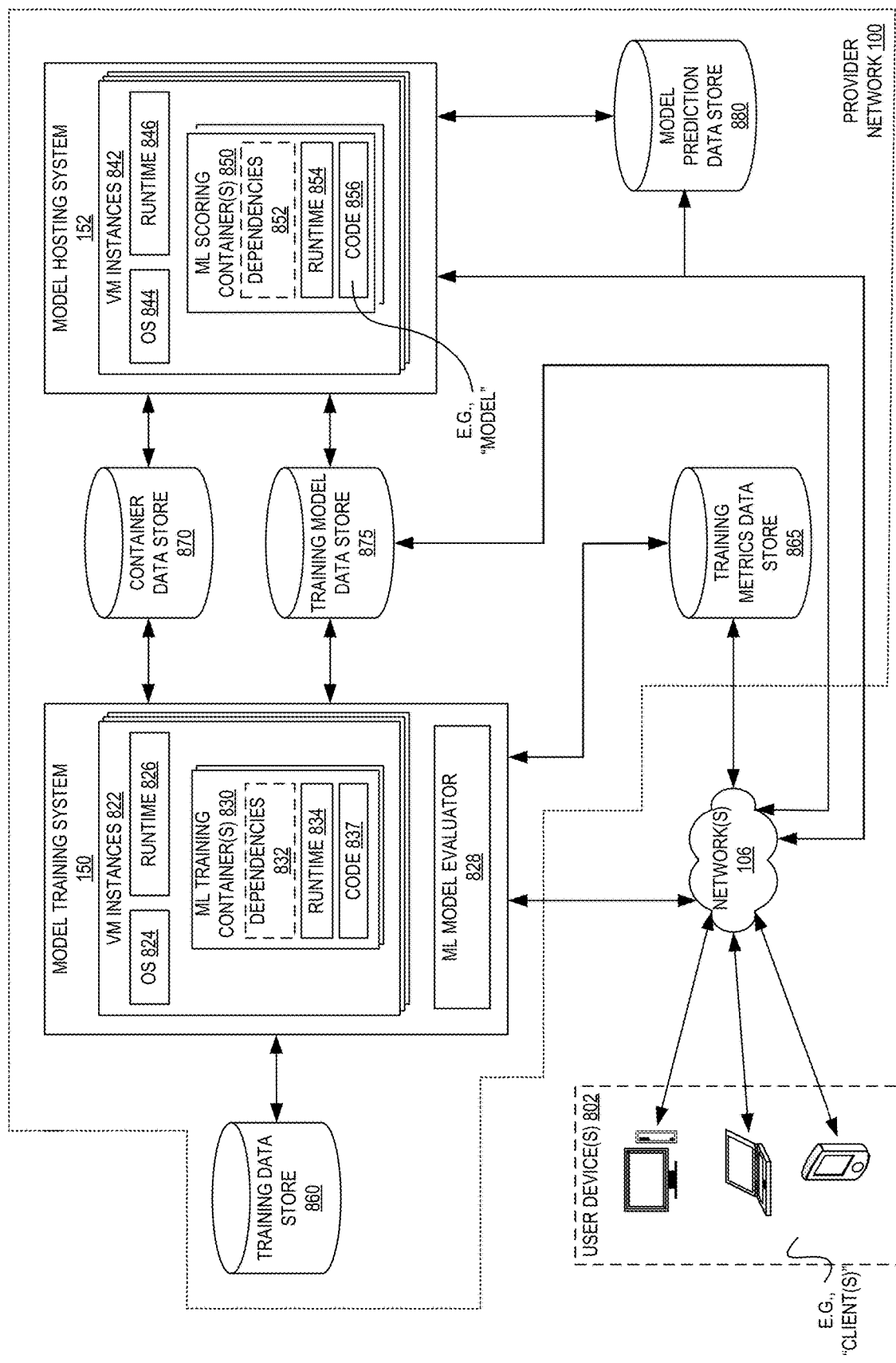
FIG. 8 is a block diagram of an illustrative operating environment in which machine learning models are trained and hosted according to some embodiments.

FIG. 8 is a block diagram of an illustrative operating environment in which machine learning models are trained and hosted according to some embodiments. The operating environment includes end user devices 802 (for example, computing devices 104, computing device 107), a model training system 150, a model hosting system 152, a training data store 860, a training metrics data store 865, a container data store 870, a training model data store 875, and a model prediction data store 880.

A machine learning service 130 described herein may include one or more of these components, such as the model hosting system 152, model training system 150, and so forth.

In some embodiments, users, by way of user devices 802, interact with the model training system 150 to provide data that causes the model training system 150 to train one or more machine learning models, for example, as described elsewhere herein. A machine learning model, generally, may be thought of as one or more equations that are "trained" using a set of data. In some embodiments, the model training system 150 provides ML functionalities as a web service, and thus messaging between user devices 802 and the model training system 150 (or provider network 100), and/or between components of the model training system 150 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 802 can interact with the model training system 150 via frontend of the model training system 150. For example, a user device 802 can provide a training request to the frontend that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 802, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 802 may provide, in the training request, an algorithm written in any programming language. The model training system 150 then packages the algorithm into a container (optionally with other code, such as a "base" ML algorithm supplemented with user-provided code) that is eventually loaded into a virtual machine instance 822 for training a machine learning model, as described in greater detail below. For example, a user, via a user device 802, may develop an algorithm/code using an application (for example, an interactive web-based programming environment) and cause the algorithm/code to be provided—perhaps as part of a training request (or referenced in a training request)—to the model training system 150, where this algorithm/code may be containerized on its own or used together with an existing container having a machine learning framework, for example.

In some embodiments, instead of providing a container image in the training request, the user device 802 provides, in the training request, an indicator of a container image (for example, an indication of an address or a location at which a container image is stored). For example, the container image can be stored in a container data store 870, and this container image may have been previously created/uploaded by the user. The model training system 150 can retrieve the container image from the indicated location and create a container using the retrieved container image. The container is then loaded into a virtual machine instance 822 for training a machine learning model, as described in greater detail below.

The model training system 150 can use the information provided by the user device 802 to train a machine learning model in one or more pre-established virtual machine instances 822 in some embodiments. In particular, the model training system 150 includes a single physical computing device or multiple physical computing devices that are interconnected using one or more computing networks (not shown), where the physical computing device(s) host one or more virtual machine instances 822. The model training system 150 can handle the acquisition and configuration of compute capacity (for example, containers, instances, etc., which are described in greater detail below) based on the information describing the computing machine on which to train a machine learning model provided by the user device 802. The model training system 150 can then train machine learning models using the compute capacity, as is described in greater detail below. The model training system 150 can automatically scale up and down based on the volume of training requests received from user devices 802 via frontend, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 822 are utilized to execute tasks. For example, such tasks can include training a machine learning model. As shown in FIG. 8, each virtual machine instance 822 includes an operating system (OS) 824, a language runtime 826, and one or more ML training containers 830. Generally, the ML training containers 830 are logical units created within a virtual machine instance using the resources available on that instance and can be utilized to isolate execution of a task from other processes (for example, task executions) occurring in the instance. In some embodiments, the ML training containers 830 are formed from one or more container images and a top container layer. Each container image may further include one or more image layers, where each image layer represents an executable instruction. As described above, some or all of the executable instructions together represent an algorithm that defines a machine learning model. Changes made to the ML training containers 830 (for example, creation of new files, modification of existing files, deletion of files, etc.) are stored in the top container layer. If a ML training container 830 is deleted, the top container layer is also deleted. However, the container image(s) that form a portion of the deleted ML training container 830 can remain unchanged. The ML training containers 830 can be implemented, for example, as Linux containers (LXC), Docker containers, and the like.

The ML training containers 830 may include individual a runtime 834, code 837, and dependencies 832 needed by the code 837 in some embodiments. The runtime 834 can be defined by one or more executable instructions that form at least a portion of a container image that is used to form the ML training container 830 (for example, the executable instruction(s) in the container image that define the operating system and/or runtime to run in the container formed from the container image). The code 837 includes one or more executable instructions that form at least a portion of a container image that is used to form the ML training container 830. For example, the code 837 includes the executable instructions in the container image that represent an algorithm that defines a machine learning model, which may reference (or utilize) code or libraries from dependencies 832. The runtime 834 is configured to execute the code 837 in response to an instruction to begin machine learning model training Execution of the code 837 results in the generation of model data, as described in greater detail below.

In some embodiments, the code 837 includes executable instructions that represent algorithms that define different machine learning models. For example, the code 837 includes one set of executable instructions that represent a first algorithm that defines a first machine learning model and a second set of executable instructions that represent a second algorithm that defines a second machine learning model. In some embodiments, the virtual machine instance 822 executes the code 837 and trains all of the machine learning models. In some embodiments, the virtual machine instance 822 executes the code 837, selecting one of the machine learning models to train. For example, the virtual machine instance 822 can identify a type of training data indicated by the training request and select a machine learning model to train (for example, execute the executable instructions that represent an algorithm that defines the selected machine learning model) that corresponds with the identified type of training data.

In some embodiments, the runtime 834 is the same as the runtime 826 utilized by the virtual machine instance 822. In some embodiments, the runtime 834 is different than the runtime 826 utilized by the virtual machine instance 822.

In some embodiments, the model training system 150 uses one or more container images included in a training request (or a container image retrieved from the container data store 870 in response to a received training request) to create and initialize a ML training container 830 in a virtual machine instance 822. For example, the model training system 150 creates a ML training container 830 that includes the container image(s) and/or a top container layer.

Prior to beginning the training process, in some embodiments, the model training system 150 retrieves training data from the location indicated in the training request. For example, the location indicated in the training request can be a location in the training data store 860. Thus, the model training system 150 retrieves the training data from the indicated location in the training data store 860. In some embodiments, the model training system 150 does not retrieve the training data prior to beginning the training process. Rather, the model training system 150 streams the training data from the indicated location during the training process. For example, the model training system 150 can initially retrieve a portion of the training data and provide the retrieved portion to the virtual machine instance 822 training the machine learning model. Once the virtual machine instance 822 has applied and used the retrieved portion or once the virtual machine instance 822 is about to use all of the retrieved portion (for example, a buffer storing the retrieved portion is nearly empty), then the model training system 150 can retrieve a second portion of the training data and provide the second retrieved portion to the virtual machine instance 822, and so on.

To perform the machine learning model training, the virtual machine instance 822 executes code 837 stored in the ML training container 830 in some embodiments. For example, the code 837 includes some or all of the executable instructions that form the container image of the ML training container 830 initialized therein. Thus, the virtual machine instance 822 executes some or all of the executable instructions that form the container image of the ML training container 830 initialized therein to train a machine learning model. The virtual machine instance 822 executes some or all of the executable instructions according to the hyperparameter values included in the training request. As an illustrative example, the virtual machine instance 822 trains a machine learning model by identifying values for certain parameters (for example, coefficients, weights, centroids, etc.). The identified values depend on hyperparameters that define how the training is performed. Thus, the virtual machine instance 822 can execute the executable instructions to initiate a machine learning model training process, where the training process is run using the hyperparameter values included in the training request. Execution of the executable instructions can include the virtual machine instance 822 applying the training data retrieved by the model training system 150 as input parameters to some or all of the instructions being executed.

In some embodiments, executing the executable instructions causes the virtual machine instance 822 (for example, the ML training container 830) to generate model data. For example, the ML training container 830 generates model data and stores the model data in a file system of the ML training container 830. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 150 itself) pulls the generated model data from the ML training container 830 and stores the generated model data in the training model data store 875 in an entry associated with the virtual machine instance 822 and/or the machine learning model being trained. In some embodiments, the virtual machine instance 822 generates a single file that includes model data and stores the single file in the training model data store 875. In some embodiments, the virtual machine instance 822 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some embodiments, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained machine learning model during different stages of the training process. Accordingly, before training is complete, a user, via the user device 802 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 875.

In some embodiments, a virtual machine instance 822 executes code 837 stored in a plurality of ML training containers 830. For example, the algorithm included in the container image can be in a format that allows for the parallelization of the training process. Thus, the model training system 150 can create multiple copies of the container image provided in a training request and cause the virtual machine instance 822 to load each container image copy in a separate ML training container 830. The virtual machine instance 822 can then execute, in parallel, the code 837 stored in the ML training containers 830. The virtual machine instance 822 can further provide configuration information to each ML training container 830 (for example, information indicating that N ML training containers 830 are collectively training a machine learning model and that a particular ML training container 830 receiving the configuration information is ML training container 830 number X of N), which can be included in the resulting model data. By parallelizing the training process, the model training system 150 can significantly reduce the training time in some embodiments.

In some embodiments, a plurality of virtual machine instances 822 execute code 837 stored in a plurality of ML training containers 830. For example, the resources used to train a particular machine learning model can exceed the limitations of a single virtual machine instance 822. However, the algorithm included in the container image can be in a format that allows for the parallelization of the training process. Thus, the model training system 150 can create multiple copies of the container image provided in a training request, initialize multiple virtual machine instances 822, and cause each virtual machine instance 822 to load a container image copy in one or more separate ML training containers 830. The virtual machine instances 822 can then each execute the code 837 stored in the ML training containers 830 in parallel. The model training system 150 can further provide configuration information to each ML training container 830 via the virtual machine instances 822 (for example, information indicating that N ML training containers 830 are collectively training a machine learning model and that a particular ML training container 830 receiving the configuration information is ML training container 830 number X of N, information indicating that M virtual machine instances 822 are collectively training a machine learning model and that a particular ML training container 830 receiving the configuration information is initialized in virtual machine instance 822 number Y of M, etc.), which can be included in the resulting model data. As described above, by parallelizing the training process, the model training system 150 can significantly reduce the training time in some embodiments.

In some embodiments, the model training system 150 includes a plurality of physical computing devices and two or more of the physical computing devices hosts one or more virtual machine instances 822 that execute the code 837. Thus, the parallelization can occur over different physical computing devices in addition to over different virtual machine instances 822 and/or ML training containers 830.

In some embodiments, the model training system 150 includes a ML model evaluator 828. The ML model evaluator 828 can monitor virtual machine instances 822 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 828 can obtain the model data for a machine learning model being trained and evaluation data from the training data store 860. The evaluation data is separate from the data used to train a machine learning model and includes both input data and expected outputs (for example, known results), and thus the ML model evaluator 828 can define a machine learning model using the model data and execute the machine learning model by providing the input data as inputs to the machine learning model. The ML model evaluator 828 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 828 periodically generates model metrics during the training process and stores the model metrics in the training metrics data store 865 in some embodiments. While the machine learning model is being trained, a user, via the user device 802, can access and retrieve the model metrics from the training metrics data store 865. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 802, can transmit a request to the model training system 150 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 150 can modify the machine learning model accordingly. For example, the model training system 150 can cause the virtual machine instance 822 to optionally delete an existing ML training container 830, create and initialize a new ML training container 830 using some or all of the information included in the request, and execute the code 837 stored in the new ML training container 830 to restart the machine learning model training process. As another example, the model training system 150 can cause the virtual machine instance 822 to modify the execution of code stored in an existing ML training container 830 according to the data provided in the modification request. In some embodiments, the user, via the user device 802, can transmit a request to the model training system 150 to stop the machine learning model training process. The model training system 150 can then instruct the virtual machine instance 822 to delete the ML training container 830 and/or to delete any model data stored in the training model data store 875.

As described below, in some embodiments, the model data stored in the training model data store 875 is used by the model hosting system 152 to deploy machine learning models. Alternatively or additionally, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 822 are shown in FIG. 8 as a single grouping of virtual machine instances 822, some embodiments of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some embodiments, those virtual machine instances 822 within the warming pool can be pre-initialized with an operating system, language runtimes, and/or other software required to enable rapid execution of tasks (for example, rapid initialization of machine learning model training in ML training container(s) 830) in response to training requests.

In some embodiments, the model training system 150 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model hosting system 152, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 152 includes a single physical computing device or multiple physical computing devices that are interconnected using one or more computing networks (not shown), where the physical computing device(s) host one or more virtual machine instances 842. The model hosting system 152 can handle the acquisition and configuration of compute capacity (for example, containers, instances, etc.) based on demand for the execution of trained machine learning models. The model hosting system 152 can then execute machine learning models using the compute capacity, as is described in greater detail below. The model hosting system 152 can automatically scale up and down based on the volume of execution requests received from user devices 802 via frontend of the model hosting system 152, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 842 are utilized to execute tasks. For example, such tasks can include executing a machine learning model. As shown in FIG. 8, each virtual machine instance 842 includes an operating system (OS) 844, a language runtime 846, and one or more ML scoring containers 850. The ML scoring containers 850 are similar to the ML training containers 830 in that the ML scoring containers 850 are logical units created within a virtual machine instance using the resources available on that instance and can be utilized to isolate execution of a task from other processes (for example, task executions) occurring in the instance. In some embodiments, the ML scoring containers 850 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 850 (for example, creation of new files, modification of existing files, deletion of files, etc.) are stored in the top container layer. If a ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 (for example, supporting software such as libraries) needed by the code 856 in some embodiments. The runtime 854 can be defined by one or more executable instructions that form at least a portion of a container image that is used to form the ML scoring container 850 (for example, the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines a machine learning model, which may reference dependencies 852. The code 856 can also include model data that represent characteristics of the defined machine learning model, as described in greater detail below. The runtime 854 is configured to execute the code 856 in response to an instruction to begin execution of a machine learning model. Execution of the code 856 results in the generation of outputs (for example, predicted results), as described in greater detail below.

In some embodiments, the runtime 854 is the same as the runtime 846 utilized by the virtual machine instance 842. In some embodiments, runtime 854 is different than the runtime 846 utilized by the virtual machine instance 842.

In some embodiments, the model hosting system 152 uses one or more container images included in a deployment request (or a container image retrieved from the container data store 870 in response to a received deployment request) to create and initialize a ML scoring container 850 in a virtual machine instance 842. For example, the model hosting system 152 creates a ML scoring container 850 that includes the container image(s) and/or a top container layer.

As described above, a user device 802 can submit a deployment request and/or an execution request to the model hosting system 152 via the frontend in some embodiments. A deployment request causes the model hosting system 152 to deploy a trained machine learning model into a virtual machine instance 842. For example, the deployment request can include an identification of an endpoint (for example, an endpoint name, such as an HTTP endpoint name) and an identification of one or more trained machine learning models (for example, a location of one or more model data files stored in the training model data store 875). Optionally, the deployment request also includes an identification of one or more container images stored in the container data store 870.

Upon receiving the deployment request, the model hosting system 152 initializes ones or more ML scoring containers 850 in one or more hosted virtual machine instance 842. In embodiments in which the deployment request includes an identification of one or more container images, the model hosting system 152 forms the ML scoring container(s) 850 from the identified container image(s). For example, a container image identified in a deployment request can be the same container image used to form an ML training container 830 used to train the machine learning model corresponding to the deployment request. Thus, the code 856 of the ML scoring container(s) 850 includes one or more executable instructions in the container image(s) that represent an algorithm that defines a machine learning model. In embodiments in which the deployment request does not include an identification of a container image, the model hosting system 152 forms the ML scoring container(s) 850 from one or more container images stored in the container data store 870 that are appropriate for executing the identified trained machine learning model(s). For example, an appropriate container image can be a container image that includes executable instructions that represent an algorithm that defines the identified trained machine learning model(s).

The model hosting system 152 further forms the ML scoring container(s) 850 by retrieving model data corresponding to the identified trained machine learning model(s) in some embodiments. For example, the deployment request can identify a location of model data file(s) stored in the training model data store 875. In embodiments in which a single model data file is identified in the deployment request, the model hosting system 152 retrieves the identified model data file from the training model data store 875 and inserts the model data file into a single ML scoring container 850, which forms a portion of code 856. In some embodiments, the model data file is archived or compressed (for example, formed from a package of individual files). Thus, the model hosting system 152 unarchives or decompresses the model data file to obtain multiple individual files and inserts the individual files into the ML scoring container 850. In some embodiments, the model hosting system 152 stores the model data file in the same location as the location in which the model data file was stored in the ML training container 830 that generated the model data file. For example, the model data file initially was stored in the top container layer of the ML training container 830 at a certain offset, and the model hosting system 152 then stores the model data file in the top container layer of the ML scoring container 850 at the same offset.

In embodiments in which multiple model data files are identified in the deployment request, the model hosting system 152 retrieves the identified model data files from the training model data store 875. The model hosting system 152 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 152 associates the initialized ML scoring container(s) 850 with the endpoint identified in the deployment request. For example, each of the initialized ML scoring container(s) 850 can be associated with a network address. The model hosting system 152 can map the network address(es) to the identified endpoint, and the model hosting system 152 or another system (for example, a routing system, not shown) can store the mapping. Thus, a user device 802 can refer to trained machine learning model(s) stored in the ML scoring container(s) 850 using the endpoint. This allows for the network address of an ML scoring container 850 to change without causing the user operating the user device 802 to change the way in which the user refers to a trained machine learning model.

Once the ML scoring container(s) 850 are initialized, the ML scoring container(s) 850 are ready to execute trained machine learning model(s). In some embodiments, the user device 802 transmits an execution request to the model hosting system 152 via the frontend, where the execution request identifies an endpoint and includes an input to a machine learning model (for example, a set of input data). The model hosting system 152 or another system (for example, a routing system, not shown) can obtain the execution request, identify the ML scoring container(s) 850 corresponding to the identified endpoint, and route the input to the identified ML scoring container(s) 850.

In some embodiments, a virtual machine instance 842 executes the code 856 stored in an identified ML scoring container 850 in response to the model hosting system 152 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the machine learning model characteristics and the input parameters provided, execution of the executable instructions by the virtual machine instance 842 can be completed, resulting in an output.

In some embodiments, the virtual machine instance 842 stores the output in the model prediction data store 880. Alternatively or in addition, the virtual machine instance 842 transmits the output to the user device 802 that submitted the execution result via the frontend.

In some embodiments, the execution request corresponds to a group of related trained machine learning models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the machine learning model. Execution of the second code 856 results in a second output. The virtual machine instance 842 that initialized the second ML scoring container 850 can then transmit the second output to the model prediction data store 880 and/or the user device 802 via the frontend (for example, if no more trained machine learning models are needed to generate an output) or transmit the second output to a third ML scoring container 850 initialized in the same or different virtual machine instance 842 (for example, if outputs from one or more additional trained machine learning models are needed), and the above-referenced process can be repeated with respect to the third ML scoring container 850.

While the virtual machine instances 842 are shown in FIG. 8 as a single grouping of virtual machine instances 842, some embodiments of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some embodiments, those virtual machine instances 842 within the warming pool can be pre-initialized with an operating system, language runtimes, and/or other software required to enable rapid execution of tasks (for example, rapid initialization of ML scoring container(s) 850, rapid execution of code 856 in ML scoring container(s), etc.) in response to deployment and/or execution requests.

In some embodiments, the model hosting system 152 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model training system 150, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 150 and the model hosting system 152 depicted in FIG. 8 are not meant to be limiting. For example, the model training system 150 and/or the model hosting system 152 could also operate within a computing environment having a fewer or greater number of devices than are illustrated in FIG. 8. Thus, the depiction of the model training system 150 and/or the model hosting system 152 in FIG. 8 may be taken as illustrative and not limiting to the present disclosure. For example, the model training system 150 and/or the model hosting system 152 or various constituents thereof could implement various web services components, hosted or "cloud" computing environments, and/or peer-to-peer network configurations to implement at least a portion of the processes described herein. In some embodiments, the model training system 150 and/or the model hosting system 152 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend of model training system 150 processes all training requests received from user devices 802 and provisions virtual machine instances 822. In some embodiments, the frontend serves as a front door to all the other services provided by the model training system 150. The frontend processes the requests and makes sure that the requests are properly authorized. For example, the frontend may determine whether the user associated with the training request is authorized to initiate the training process.

Similarly, frontend for model hosting system 152 processes all deployment and execution requests received from user devices 802 and provisions virtual machine instances 842. In some embodiments, the frontend serves as a front door to all the other services provided by the model hosting system 152. The frontend processes the requests and makes sure that the requests are properly authorized. For example, the frontend may determine whether the user associated with a deployment request or an execution request is authorized to access the indicated model data and/or to execute the indicated machine learning model.

The training data store 860 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 860 is depicted as being located external to the model training system 150 and the model hosting system 152, this is not meant to be limiting. For example, in some embodiments not shown, the training data store 860 is located internal to at least one of the model training system 150 or the model hosting system 152.

In some embodiments, the training metrics data store 865 stores model metrics. While the training metrics data store 865 is depicted as being located external to the model training system 150 and the model hosting system 152, this is not meant to be limiting. For example, in some embodiments not shown, the training metrics data store 865 is located internal to at least one of the model training system 150 or the model hosting system 152.

The container data store 870 stores container images, such as container images used to form ML training containers 830 and/or ML scoring containers 850, that can be retrieved by various virtual machine instances 822 and/or 842. While the container data store 870 is depicted as being located external to the model training system 150 and the model hosting system 152, this is not meant to be limiting. For example, in some embodiments not shown, the container data store 870 is located internal to at least one of the model training system 150 and the model hosting system 152.

The training model data store 875 stores model data files. In some embodiments, some of the model data files are comprised of a single file, while other model data files are packages of multiple individual files. While the training model data store 875 is depicted as being located external to the model training system 150 and the model hosting system 152, this is not meant to be limiting. For example, in some embodiments not shown, the training model data store 875 is located internal to at least one of the model training system 150 or the model hosting system 152.

The model prediction data store 880 stores outputs (for example, execution results) generated by the ML scoring containers 850 in some embodiments. While the model prediction data store 880 is depicted as being located external to the model training system 150 and the model hosting system 152, this is not meant to be limiting. For example, in some embodiments not shown, the model prediction data store 880 is located internal to at least one of the model training system 150 and the model hosting system 152.

While the model training system 150, the model hosting system 152, the training data store 860, the training metrics data store 865, the container data store 870, the training model data store 875, and the model prediction data store 880 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 802 via the one or more network(s) 106.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 150 and/or the model hosting system 152 provides the user devices 802 with one or more user interfaces, command-line interfaces (CLI), application programming interfaces (API), and/or other programmatic interfaces for submitting training requests, deployment requests, and/or execution requests. In some embodiments, the user devices 802 can execute a stand-alone application that interacts with the model training system 150 and/or the model hosting system 152 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 9:
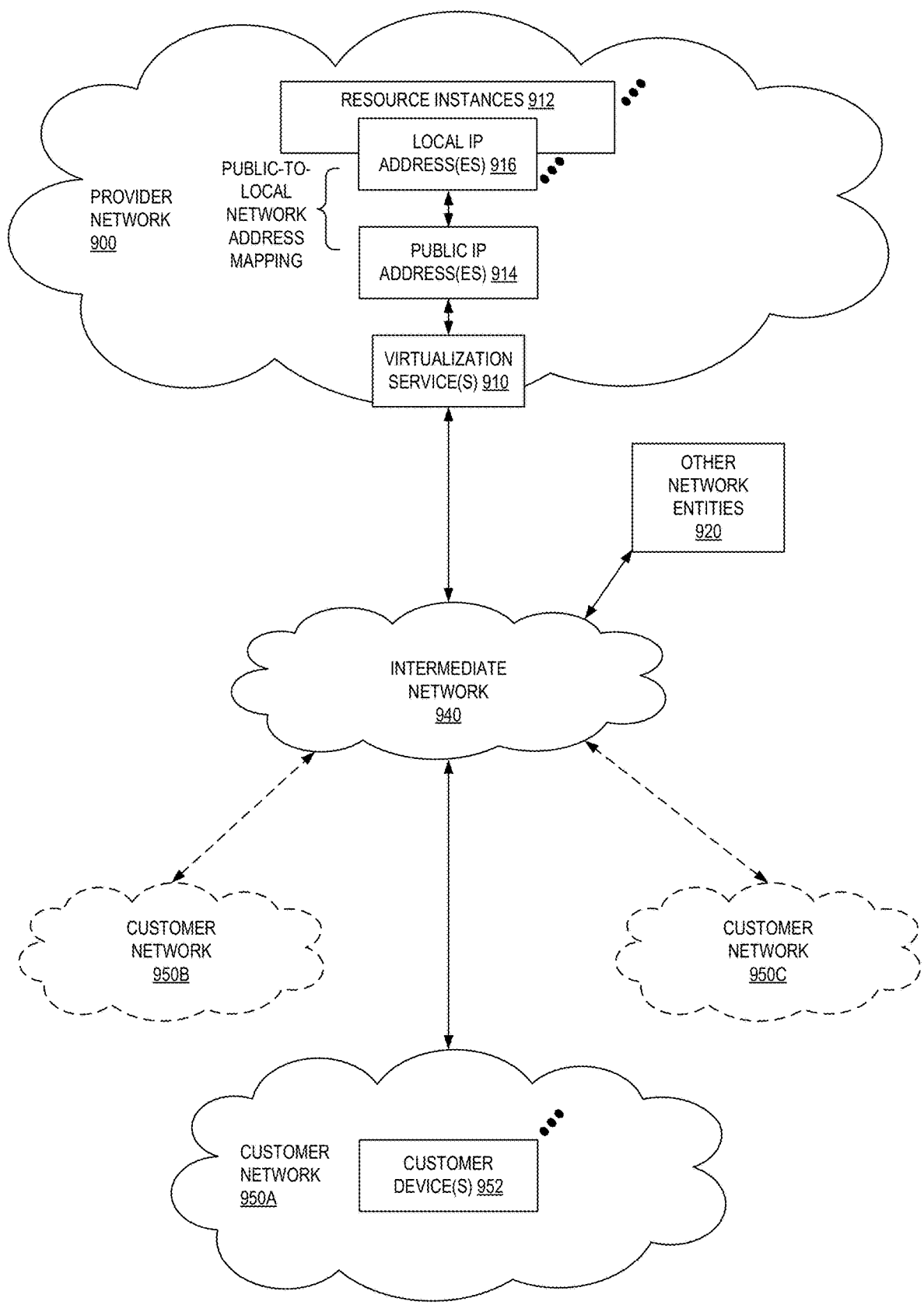
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
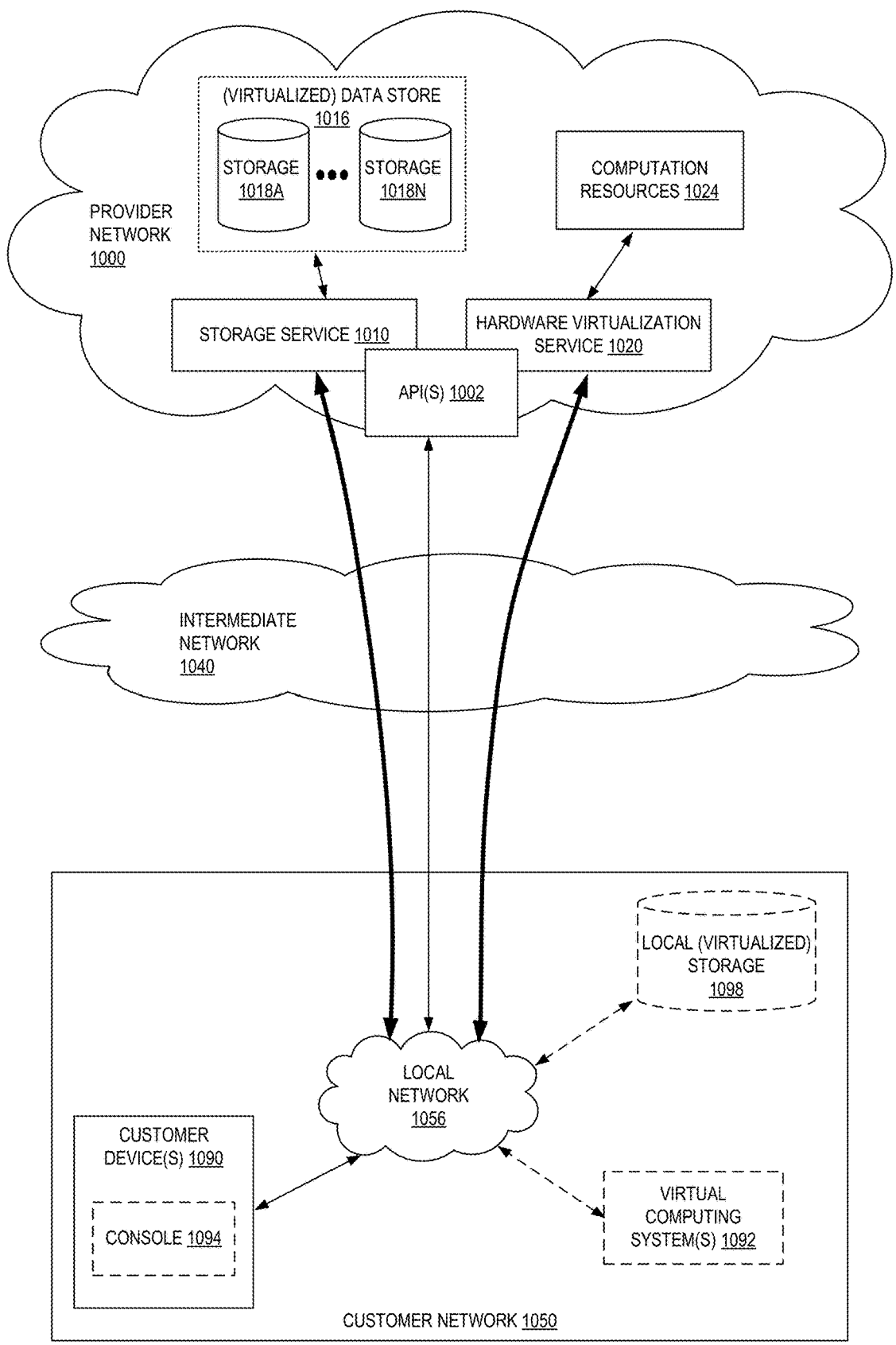
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
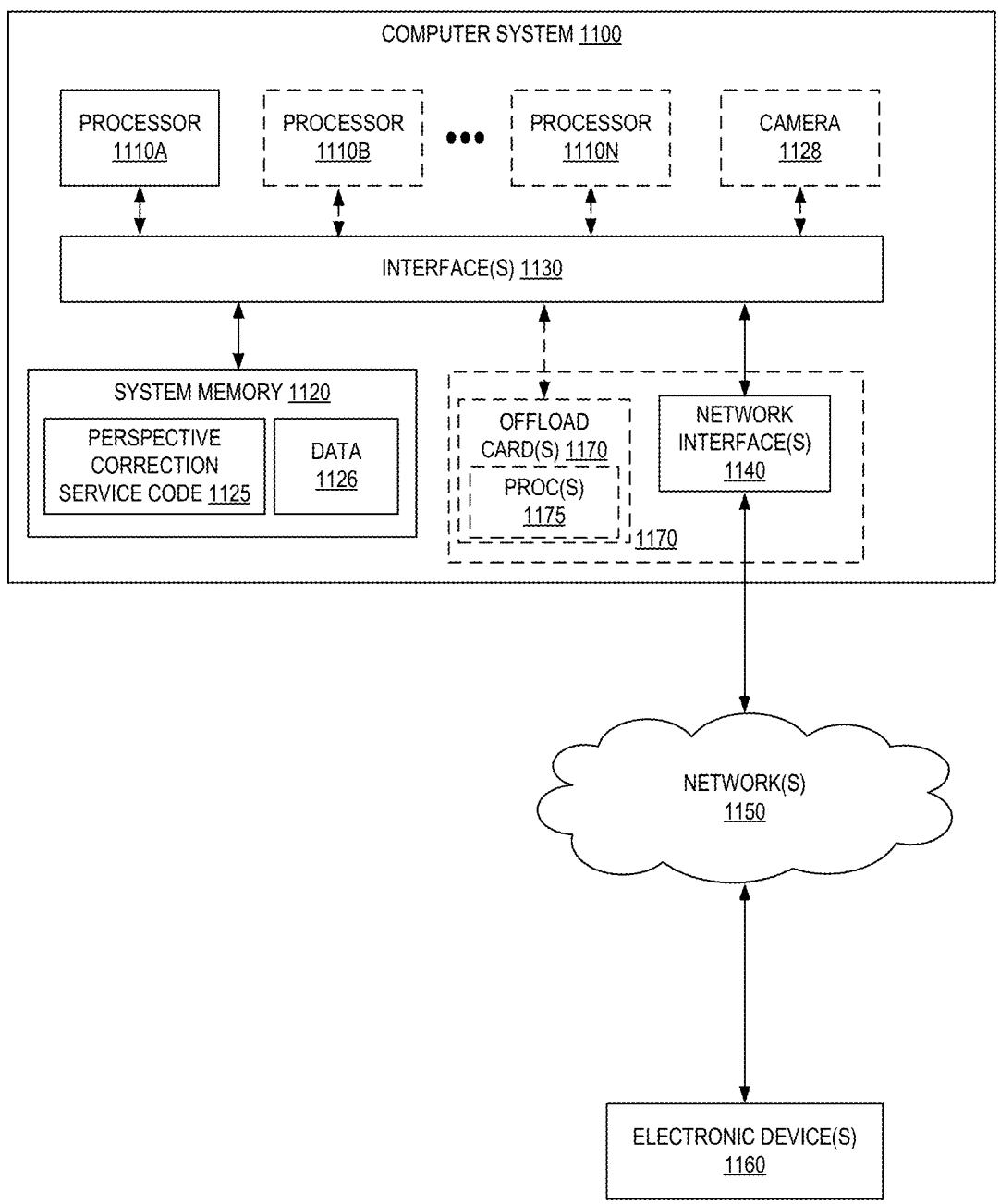
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as perspective correction service code 1125 and data 1126.

Computer system 1100 may include one or more cameras 1128, e.g., to capture (e.g., a source view of) an image.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a machine learning service of a provider network, a source view of a training image and a homography matrix of the training image;
   training, by the machine learning service of the provider network, an algorithm on the source view of the training image and the homography matrix of the training image into a machine learning model that generates a normalized homography matrix for an input of a source view;
   receiving an inference request for a source view of an input image from a user located outside the provider network;
   generating, by the machine learning model, a normalized homography matrix based at least in part on the source view of the input image;
   generating an inference response based at least in part on the normalized homography matrix for the source view of the input image; and
   transmitting the inference response to a client application or to a storage location.

2. The computer-implemented method of claim 1, wherein the generating the inference response based at least in part on the normalized homography matrix for the source view of the input image comprises performing a perspective correction on the input image with the normalized homography matrix for the source view of the input image to generate a target view of the input image.

3. The computer-implemented method of claim 1, wherein the generating the inference response based at least in part on the normalized homography matrix for the source view of the input image comprises determining a non-normalized homography matrix for the source view of the input image from the normalized homography matrix.

4. A computer-implemented method comprising:
   receiving a source view of a training image and homography data of the training image;
   training an algorithm on the source view of the training image and the homography data of the training image into a machine learning model that generates normalized homography data for an input of a source view;
   receiving an inference request for a source view of an input image;
   generating, by the machine learning model, normalized homography data based at least in part on the source view of the input image;
   generating an inference response based at least in part on the normalized homography data for the source view of the input image; and
   transmitting the inference response to a client application or to a storage location.

5. The computer-implemented method of claim 4, wherein the generating the inference response based at least in part on the normalized homography data for the source view of the input image comprises performing a perspective correction on the input image with the normalized homography data for the source view of the input image to generate a target view of the input image.

6. The computer-implemented method of claim 5, wherein the inference response includes the target view of the input image.

7. The computer-implemented method of claim 4, wherein the generating the inference response based at least in part on the normalized homography data for the source view of the input image comprises determining non-normalized homography data for the source view of the input image from the normalized homography data.

8. The computer-implemented method of claim 7, wherein the inference response includes the non-normalized homography data for the source view of the input image.

9. The computer-implemented method of claim 4, wherein the generating the normalized homography data based at least in part on the source view of the input image does not rely on detecting one or more key points of the input image.

10. The computer-implemented method of claim 4, wherein the normalized homography data based at least in part on the source view of the input image includes rotation, translation, scale, perspective, and shear components.

11. The computer-implemented method of claim 4, further comprising performing a transform on the source view of the training image to create a centered source view of the training image, wherein the training the algorithm is on the centered source view of the training image.

12. The computer-implemented method of claim 11, wherein the performing the transform comprises locating an origin of a coordinate system of the normalized homography data at an approximate center of the centered source view.

13. The computer-implemented method of claim 4, wherein the homography data of the training image is normalized homography data of the training image, and the training the algorithm includes training the algorithm on the normalized homography data of the training image.

14. The computer-implemented method of claim 4, wherein the homography data of the training image is non-normalized homography data of the training image, and the training the algorithm includes training the algorithm on the non-normalized homography data of the training image.

15. A system comprising:
- a first one or more electronic devices to implement a storage service in a multi-tenant provider network, the storage service to store a source view of a training image and homography data of the training image; and
- a second one or more electronic devices to implement a machine learning service in the multi-tenant provider network, the machine learning service including instructions that upon execution cause the machine learning service to perform operations comprising:
  - receiving the source view of the training image and the homography data of the training image;
  - training an algorithm on the source view of the training image and the homography data of the training image into a machine learning model that generates normalized homography data for an input of a source view;
  - receiving an inference request for a source view of an input image;
  - generating, by the machine learning model, normalized homography data based at least in part on the source view of the input image;
  - generating an inference response based at least in part on the normalized homography data for the source view of the input image; and
  - transmitting the inference response to a client application or to a storage location.

16. The system of claim 15, wherein the instructions upon execution cause the machine learning service to perform operations wherein the generating the inference response based at least in part on the normalized homography data for the source view of the input image comprises performing a perspective correction on the input image with the normalized homography data for the source view of the input image to generate a target view of the input image.

17. The system of claim 15, wherein the instructions upon execution cause the machine learning service to perform operations wherein the generating the inference response based at least in part on the normalized homography data for the source view of the input image comprises determining non-normalized homography data for the source view of the input image from the normalized homography data.

18. The system of claim 15, wherein the instructions upon execution cause the machine learning service to perform operations wherein the generating the normalized homography data based at least in part on the source view of the input image does not rely on detecting one or more key points of the input image.

19. The system of claim 15, wherein the instructions upon execution cause the machine learning service to perform operations further comprising performing a transform on the source view of the training image to create a centered source view of the training image, wherein the training the algorithm is on the centered source view of the training image.

20. The system of claim 15, wherein the homography data of the training image is normalized homography data of the training image, and the training the algorithm includes training the algorithm on the normalized homography data of the training image.

* * * * *